(12) United States Patent
Rander

(10) Patent No.: US 10,126,749 B2
(45) Date of Patent: *Nov. 13, 2018

(54) CONFIGURING AN AUTONOMOUS VEHICLE FOR AN UPCOMING RIDER

(71) Applicant: Uber Technologies, Inc., San Francisco, CA (US)

(72) Inventor: Peter Rander, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,485

(22) Filed: Mar. 5, 2018

(65) Prior Publication Data

US 2018/0196433 A1   Jul. 12, 2018

Related U.S. Application Data

(63) Continuation of application No. 15/089,416, filed on Apr. 1, 2016, now Pat. No. 10,012,990.

(51) Int. Cl.
| | |
|---|---|
| *B60H 1/00* | (2006.01) |
| *G06F 3/0482* | (2013.01) |
| *G06F 3/0488* | (2013.01) |
| *G05D 1/02* | (2006.01) |
| *B60N 2/02* | (2006.01) |

(52) U.S. Cl.
CPC ......... *G05D 1/021* (2013.01); *B60H 1/00742* (2013.01); *B60N 2/0244* (2013.01)

(58) Field of Classification Search
None
See application file for complete search history.

(56) References Cited

U.S. PATENT DOCUMENTS

| | | | |
|---|---|---|---|
| 6,424,410 B1 | 7/2002 | Pelosi | |
| 8,996,224 B1 | 3/2015 | Herback | |
| 9,171,268 B1 | 10/2015 | Penilla | |
| 9,335,764 B2 | 5/2016 | Herz | |
| 9,411,780 B1 | 8/2016 | Awad | |
| 9,440,605 B2* | 9/2016 | Vagdama | B60R 16/037 |
| 9,716,565 B2* | 7/2017 | Mandeville-Clarke | ...................... H04K 3/90 |

(Continued)

FOREIGN PATENT DOCUMENTS

WO   WO 2015/099679   7/2015

OTHER PUBLICATIONS

ISR and Written Opinion in PCT/US2017/023411 dated Jul. 13, 2017.

(Continued)

*Primary Examiner* — Thomas G Black
*Assistant Examiner* — Demetra R Smith-Stewart
(74) *Attorney, Agent, or Firm* — Mahamedi IP Law LLP

(57) ABSTRACT

An autonomous vehicle (AV) can receive a pick-up location to rendezvous with a rider and a set of configuration instructions to configure one or more adjustable components of the configurable interior system for the rider. The AV can analyze sensor data to autonomously control acceleration, steering, and braking systems along a route to the pick-up location. Prior to arriving at the pick-up location, the AV can execute the set of configuration instructions to configure the one or more adjustable components of the configurable interior system for the rider.

20 Claims, 11 Drawing Sheets

(56) References Cited

U.S. PATENT DOCUMENTS

| | | | |
|---|---|---|---|
| 9,789,880 B2 | 10/2017 | Sweeney | |
| 9,902,403 B2 | 2/2018 | Donnelly | |
| 2005/0040573 A1 | 2/2005 | Bolt | |
| 2012/0131455 A1 | 5/2012 | Han | |
| 2013/0197674 A1* | 8/2013 | Lowry | B60W 50/08 |
| | | | 700/19 |
| 2014/0218307 A1 | 8/2014 | Goldman-Shenhar | |
| 2014/0253722 A1 | 9/2014 | Smyth | |
| 2015/0084985 A1 | 3/2015 | Baudu | |
| 2015/0097864 A1 | 4/2015 | Alaniz | |
| 2015/0109131 A1 | 4/2015 | Lindberg | |
| 2015/0185034 A1 | 7/2015 | Abhyanker | |
| 2015/0338852 A1 | 11/2015 | Ramanujam | |
| 2015/0339928 A1 | 11/2015 | Ramanujam | |
| 2015/0346722 A1 | 12/2015 | Herz | |
| 2016/0001720 A1* | 1/2016 | Vadgama | B60R 16/037 |
| | | | 701/2 |
| 2016/0318442 A1 | 11/2016 | James | |
| 2016/0330578 A1 | 11/2016 | Moussavian | |
| 2016/0347348 A1 | 12/2016 | Lubischer | |
| 2016/0358453 A1 | 12/2016 | Wassef | |
| 2017/0103571 A1 | 4/2017 | Beaurepaire | |
| 2017/0113702 A1 | 4/2017 | Thieberger-Navon | |
| 2017/0126810 A1* | 5/2017 | Kentley | H04L 67/125 |
| 2017/0132334 A1 | 5/2017 | Levinson | |
| 2017/0132769 A1 | 5/2017 | Barron | |
| 2017/0136842 A1 | 5/2017 | Anderson | |
| 2017/0151918 A1 | 6/2017 | Boesen | |
| 2017/0153319 A1 | 6/2017 | Villeneuve | |
| 2017/0153636 A1 | 6/2017 | Boesen | |
| 2017/0158023 A1 | 6/2017 | Stevanovic | |
| 2017/0253252 A1 | 9/2017 | Donnelly | |
| 2017/0253254 A1 | 9/2017 | Sweeney | |
| 2017/0256229 A1 | 9/2017 | Kocharlakota | |
| 2017/0276494 A1 | 9/2017 | Kusano | |
| 2017/0277191 A1* | 9/2017 | Fairfield | H04W 4/029 |
| 2017/0291538 A1 | 10/2017 | Sivak | |
| 2017/0313326 A1 | 11/2017 | Sweeney | |
| 2018/0040162 A1 | 2/2018 | DonnellY | |
| 2018/0040163 A1 | 2/2018 | Donnelly | |
| 2018/0086344 A1 | 3/2018 | Zhu | |
| 2018/0089901 A1 | 3/2018 | Rober | |

OTHER PUBLICATIONS

Gervautz, et al. Anywhere Interfaces Using Handheld Augmented Reality, 2012, IEEE, p. 26-31.

Munoz, et al., PhysioVR: A Novel Mobile Virtual Reality Framework for Physiological Computing, 2016, IEEE, p. 1-6.

Brogan, et al., Dynamically Simulated Characters in Virtual Environments, 1998, IEEE, p. 58-69.

Rao, et al., AR-IVI—Implementation of In-Vehicle Augmented Reality, 2014, IEEE, p. 3-8.

Ai, et al. Real-Time Unmanned Aerial Vehicle 3D Environment Exploration in a Mixed Reality Environment, 2016, IEEE, p. 664-670.

Zhi-Hua, et al., Design of UAV Telepresence and Simulation Platform based on VR, 2008, IEEE, p. 520-524.

Santano, et al., Aerial Videography in Built-Heritage Documentation: The Case of Post-Independence Architeture of Malaysia, 2014, IEEE, p. 1-6.

Chae, et al., The Comparison of the Detecting Performance between the Ground and the Aerial Visual Analytics in the UGV-UAV Collaborative System, 2016, IEEE, p. 524-529.

* cited by examiner

US 10,126,749 B2

CONFIGURING AN AUTONOMOUS VEHICLE FOR AN UPCOMING RIDER

CROSS REFERENCE TO RELATED APPLICATION

This application is a Continuation of U.S. patent application Ser. No. 15/089,416, titled "Optimizing Timing for Configuring an Autonomous Vehicle," and filed on Apr. 1, 2016; the aforementioned application being hereby incorporated by reference in its entirety.

BACKGROUND

For a personal use vehicle, a driver can permanently configure the components of the vehicle according to the driver's preferences. For example, the driver can adjust the seat and mirrors, set preferred radio stations, set a preferred temperature, adjust the steering wheel setting, and the like. For frequent use vehicles (e.g., car rentals or shared vehicles), drivers and passengers must make adjustments to the various components of the vehicle for each use.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
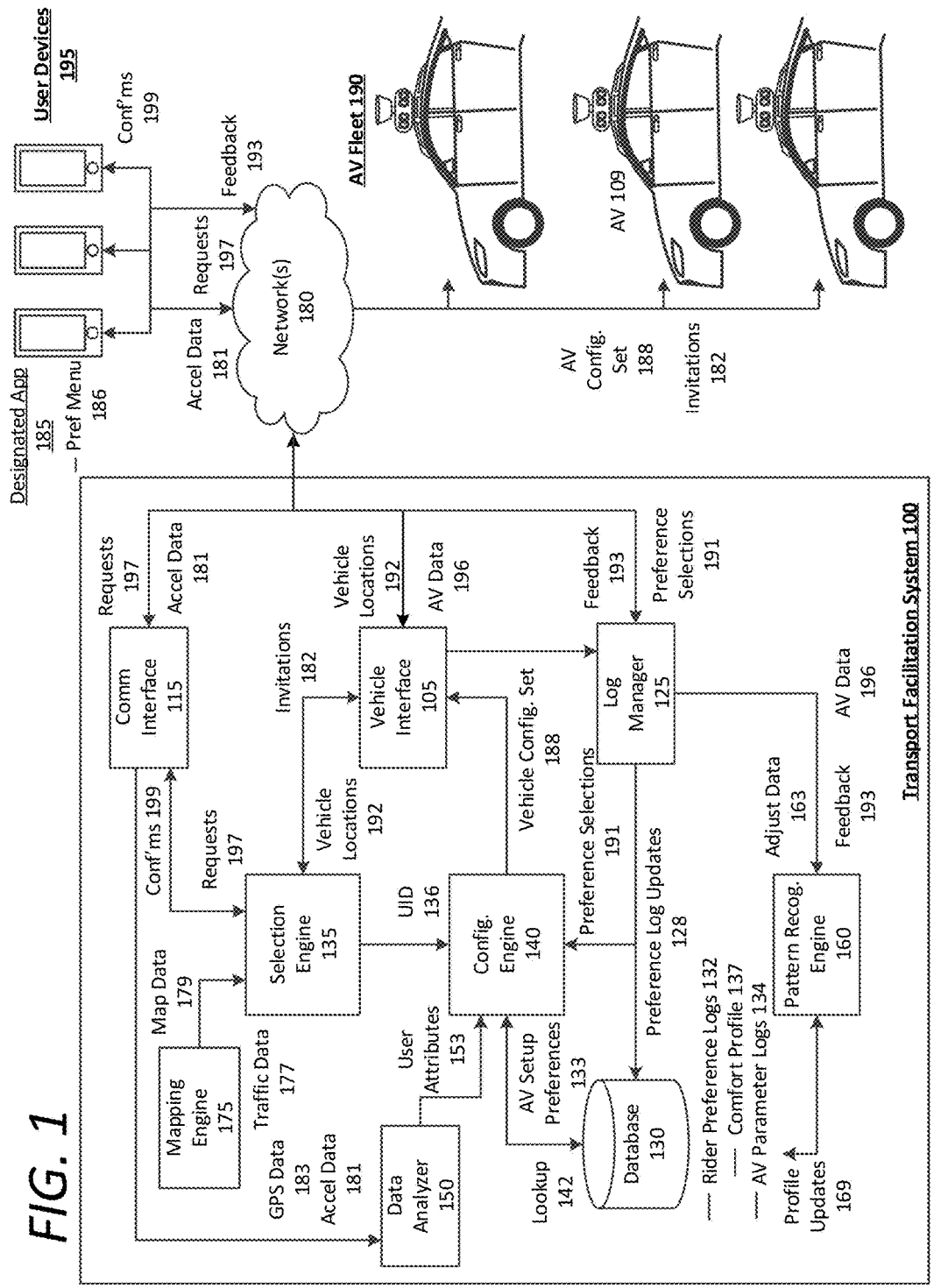
FIG. 1 is a block diagram illustrating an example transport facilitation system in communication with user devices and a fleet of AVs, as described herein.

A transport facilitation system is disclosed that can configure an autonomous vehicle (AV) for a requesting user prior to pick-up. In certain implementations, the transport facilitation system can provide an application-based transportation arrangement service that can arrange transportation for requesting users throughout a given region. In many examples described herein, the transport facilitation system can receive pick-up requests from users within the given region and select AVs proximate to the requesting users to service the pick-up requests. Broadly speaking, the transport facilitation system can transmit configuration commands to cause the selected AVs to configure various interior components (e.g., seat positions, individual seat adjustments, seat temperature, air temperature, radio settings, windows, mirrors, lighting, etc.) based on the preferences or requirements of the requesting user.

In some examples, a user interface can be generated on a requesting user's mobile computing device, enabling the user to set preference parameters for the AV prior to pick-up. For example, the user interface can be generated on a designated application for a transportation arrangement service managed by the transport facilitation system. In certain aspects, the requesting user can configure a comfort profile indicating preferred AV settings, and the comfort profile can be stored by the transport facilitation system, or locally on the mobile computing device.

Additionally or alternatively, upon receiving a pick-up request from a requesting user, the backend transport facilitation system can select a proximate AV to service the pick-up request, determine the configurable parameters of the AV, and cause the user interface on the requesting user's mobile computing device to generate a preference menu—based on the configurable parameters of the selected AV—that enables the user to make selections to configure various adjustable parameters of the AV prior to pick-up. The adjustable parameters can include seat positioning, seat temperature, air temperature, a seating configuration, a home page display on a display screen, a language preference, preferred radio stations, interior lighting (e.g., colors, brightness), and the like. Additionally or alternatively, the backend transport facilitation system can transmit a notification to the requesting user's mobile computing device to indicate a particular seat of the AV that has been assigned and configured for that user (e.g., with preferred seat adjustments, temperature, audio selections, etc.). Such notifications may be advantageous for AV carpooling in which the transport facilitation system can route a particular AV to make multiple pick-ups and drop-offs while configuring individual seats and user preferences of the AV at the same time.

Additionally or alternatively, upon transmitting a pick-up request, accelerometer data from the user's mobile computing device can be analyzed to determine a height, weight, body type, and/or gait of the user to make adjustments to a seat on which the user will travel in the AV. In some aspects, the mobile computing device can transmit the raw accelerometer data and location data to the transport facilitation system to analyze for directional acceleration peaks to determine stride length or gait pattern signatures of the user. Based on these data, the transport facilitation system can determine the height and/or weight of the user on a high level, and on a lower level, the user's femur length, leg length (and estimated torso length), and/or an estimated posture in order to make adjustments to, for example, a backrest angle, a thigh extension (e.g., cushion edge adjustment), a fore-and-aft position, a headrest angle, a headrest level, a lumbar position, a seat depth, a seat height, an upper seat tilt angle, and a shoulder support element of the user's seat.

Additionally, an AV is disclosed that optimizes timing to configure preference settings when en route to rendezvous with a requesting user. The AV can receive a set of configurations for interior systems based on user preferences and determine an optimal timing schedule to configure each of the interior systems such that the AV is configured for the requesting user as the AV arrives at the pick-up location. For certain systems, like the seating configuration system and the seat adjustment system, the AV can execute the user's preferences just prior to pick-up (e.g., 15-20 seconds prior to arriving at the pick-up location). For other systems, like the seat temperature and climate control systems, the AV can determine a time frame necessary to achieve the preferred temperature(s) and can perform an optimization operation to initiate the climate control system and/or seat temperature system to achieve the desired temperature(s) just prior to arriving at the pick-up location in order to optimize power consumption. In variations, some or all of the timing characteristics for optimizing timing to configure the AV may be performed by the transport facilitation system. Accordingly, the optimal timing schedule can be determined by the transport facilitation system and transmitted to the AV for execution prior to pick-up.

In some aspects, the transport facilitation system can store preference logs or comfort profiles in a database that indicate setup preferences—corresponding to the adjustable interior component of the AV—for users of the transportation arrangement service. The transport facilitation system can receive a pick-up request from computing device running a designated application of the transportation arrangement service. The pick-up request can include a unique identifier identifying the requesting user of the computing device, and a pick-up location. Using the unique identifier, the transport facilitation system can perform a lookup in the database for a comfort profile indicating AV setup preferences for the user. Based on the pick-up location, the transport facilitation system can select an AV to service the pick-up request. And, based on the AV setup preferences for the user, the transport facilitation system can transmit a set of configuration commands to configure the adjustable components of the AV for the user prior to the AV rendezvousing with the requesting user. Accordingly, the interior systems of the AV can be preemptively configured prior to pick-up.

Additionally, the transport facilitation system can service pick-up requests for respective users over time and receive configuration data corresponding to the user configuring the interior systems (e.g., seat positioning, radio station selections, browsing data, etc.). The transport facilitation system can identify preference patterns in the configuration data and store and update preference data for each of the user in the database based on the preference patterns. In some examples, the preference data for a user may be updated based on feedback provided by the user. For example, the transport facilitation system can receive feedback indicating user experience ratings for AV rides. In some aspects, if the rating is below a certain threshold (e.g., two out of five stars), the transport facilitation system can be triggered to analyze AV data for the trip to identify potential causes for the low rating. The AV data can include control system inputs and sensor data corresponding to acceleration, braking, and steering of the AV during the trip and/or data indicating an operational mode of the AV during the trip (e.g., a normal mode or high caution mode). In the AV data, the transport facilitation system can identify anomalous instances indicating potential causes for the rating being below the predetermined threshold. For example, the transport facilitation system can identify instances of anomalous braking, anomalous acceleration, anomalous steering, over-caution, under-caution, speeding, and/or driving too slowly by the AV. Over time, the transport facilitation system can identify certain patterns and learn the user's preferences based on ratings information and update the preferences of the user to mitigate anomalous instances in future rides. For example, using the ratings data, the transport facilitation system can learn that the user prefers more expedient travel as opposed to more highly cautious travel.

Among other benefits, the examples described herein achieve a technical effect of providing comfort to users of a transportation arrangement service by preemptively configuring the interior systems of an autonomous vehicle (AV) prior to pick-up. Such preemptive configuring may be performed based on a stored comfort or preference profile, by way of user inputs prior to pick-up, by analyzing acceleration data from the user's mobile device, and/or by machine learning techniques over time.

As used herein, a computing device refers to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV). An AV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs can drive without any human assistance from within or external to the vehicle. Such vehicles are often required to make advanced determinations regarding how the vehicle behaves given challenging surroundings of the vehicle environment.

System Descriptions

FIG. 1 is a block diagram illustrating an example transport facilitation system in communication with user devices and a fleet of AVs or service vehicles, as described herein. The transport facilitation system 100 can include a communications interface 115 to communicate with the user devices 195 and the fleet of autonomous vehicles 190 over a number of networks 180. In addition or in variations, the transport facilitation system 100 can communicate with human drivers operating service vehicles to facilitate transportation in accordance with a transportation arrangement service managed by the transport facilitation system 100. In many examples, the transport facilitation system 100 can provide the transportation arrangement service to link requesting users with service vehicles and/or AVs in the AV fleet 190 managed by the transport facilitation system 100. A designated application 185 corresponding to the transportation arrangement service can be executed on the user devices 195. A requesting user can provide an input on a user device 195 to transmit a pick-up request 197 to the transport facilitation system 100. The pick-up request 197 can be received by the communications interface 115 and sent to a selection engine 135, which can match the requesting user with a proximate AV from the fleet 190.

In one or more examples, the pick-up request 197 can include a pick-up location where a selected AV 109 can rendezvous with the requesting user. The fleet of AVs 190 can be dispersed throughout a given region (e.g., a city or metropolitan area) and transmit vehicle location data 192 to an vehicle interface 105 of the transport facilitation system 100. The vehicle interface 105 can transmit the vehicle locations 192 to the selection engine 135 in order to enable the selection engine 135 to determine candidate vehicles that can readily service the pick-up request 197. In some examples, the pick-up request 197 can include a unique identifier 136 for the requesting user, which can be utilized by a configuration engine 140 to initially determine whether the requesting user has a vehicle type preference. For example, the configuration engine 140 can utilize the unique identifier 136 for the requesting user to perform a lookup 142 in rider preference logs 132 in a database 130 of the transport facilitation system 100. A matching rider preference log 132 for the requesting user can, among other things described herein, indicate a preferred vehicle type (e.g., a sport utility vehicle, a van, a sports vehicle, a station wagon, a mid-sized, large or compact vehicle, a luxurious vehicle, etc.). Additionally or alternatively, the configuration engine 140 can transmit a prompt to the requesting user, via the designated application 185, asking whether the requesting user prefers a certain type of vehicle.

Based on the pick-up location, the locations of proximate AVs in the fleet 190 or other proximate human-driven service vehicles, and optionally a preferred vehicle type, the selection engine 135 can select a vehicle (e.g., AV 109) that fulfills the criteria. In certain aspects, the selection engine 135 can further utilize a mapping engine 175 to identify a most optimal vehicle (e.g., AV 109) based on map data 179 (e.g., a distance to the pick-up location) and/or traffic data 177 (e.g., a time to reach the pick-up location). Upon selecting AV 109 as being the most optimal vehicle, the selection engine 135 can transmit an invitation 182 to AV 109 to service the pick-up request 197. In some examples, AV 109 can accept or deny the invitation depending on a number of factors (e.g., remaining fuel or energy, service indicators, owner requirements, etc.). In certain implementations, when AV 109 accepts the invitation 182, the transport facilitation system 100 can utilize the map data 179 and traffic data 177 to provide AV 109 with route information indicating a shortest or most optimal route to the pick-up location. Alternatively, AV 109 may be provided with local mapping resources to identify the most optimal route independently.

According to some examples described herein, the transport facilitation system 100 can include a data analyzer 150 that can receive accelerometer data 181 and location data (e.g., GPS data 183) from user devices 195 to determine user attributes 153, such as an estimated height of a requesting user. In various implementations, the data analyzer 150 can further process the accelerometer data 181 and GPS data 183 to estimate other high-level attributes 153 of the requesting user, such as weight and body type (e.g., slim, normal, large). In still other implementations, the data analyzer 150 can further process the accelerometer data 181 and GPS data 183 to estimate or determine low level attributes 153 of the user, such as femur length, leg length, posture information, torso length, and the like.

For example, upon receiving a pick-up request 197 from a particular user device 195, the transport facilitation system 100 can access accelerometer data 181 and GPS data 183 (e.g., via the designated application 185) from an accelerometer and GPS module of the user device 195. In certain aspects, the accelerometer may be housed in an inertial measurement unit and can provide a stream of accelerometer data 181 which the data analyzer 150 can process to determine or estimate the user's attributes 153. Accordingly, when the requesting user places the device 195 in a pocket, or otherwise holds the device 195, and begins walking, the accelerometer data 181 can include stride signatures, gait signatures, and/or sway signatures as well as directional acceleration peaks corresponding to each stride. The nature, timing, magnitude, and direction of the acceleration peaks—as well as the distance traveled (e.g., a distance walked by the user)—can be analyzed by the data analyzer 150 to determine the requesting user's attributes 153, which may then be transmitted to the configuration engine 140. Based on the determine attributes 153 of the requesting user, the configuration engine 140 can determine a vehicle configuration set 188 to configure a passenger seat of the selected AV 109 in order to provide the requesting user with an optimal comfort setting when entering the selected AV 109.

In determining the configuration set 188, the configuration engine 140 can implement machine learning based on the user's attributes 153 determined from the accelerometer data 181 and GPS data 183 from the user's device 195. In certain aspects, the configuration engine 140 can access other similar comfort profiles 137 using the user attributes 153. For example, the configuration engine 140 can perform a lookup 142 in the database 130 using the requesting user's determined height, weight, body type, leg length, etc., to identify a set of matching comfort profiles 137 for user's with similar attributes. The configuration engine 140 can utilize the matching comfort profiles 137 as a basis for generating the configuration get 188 for the requesting user. In one example, the configuration engine 140 can rank a set of matching comfort profiles 137 based on similarity of user attributes, and utilize a top grouping (e.g., the top five or ten) to generate the configuration set 188. Additionally or alternatively, the configuration engine 140 can calculate and utilize average(s) of the configuration settings (e.g., seat adjustment and positioning settings) of the matching comfort profiles 137, and generate the configuration set 188 for the requesting user based on the calculated averages.

In examples, the configuration engine 140 can generate the vehicle configuration set 188 to map configurable parameters of an AV or service vehicle seat with the user attributes 153 determined from the accelerometer data 181 from the requesting user's device 195. For example, the configuration engine 140 can correlate the determined or estimated height of the requesting user with a fore-and-aft position of the seat. The configuration engine 140 can further correlate the determined or estimated weight or body type of the user with a backrest angle, a seat depth, and/or a seat height. The configuration engine 140 can further correlate a determined or estimated leg length of the requesting user with a thigh extension setting or a cushion edge adjustment of the seat in order to minimize knee and lower back strain. Further correlations between the determined or estimated attributes 153 of the requesting user with adjustable parameters of the seat are also contemplated. For example, posture information indicated in signatures of the accelerometer data 181 can be utilized by the configuration engine 140 to generate a command to adjust cushion softness, a lumbar support element, a shoulder support element, a headrest angle, and the like.

The vehicle configuration set 188 can be transmitted to the selected AV 109 via the vehicle interface 105 over a network 180. For example, the selection engine 135 can select AV 109 to service the pick-up request 197 from the requesting user, and transmit an invitation 182 to AV 109 via the vehicle interface 105. The data analyzer 150 can process the accelerometer data 191 and the GPS data 183 from the requesting user's device 195 to determine the user attributes 153. The configuration engine 140 can map the user attributes 153 to seat adjustment parameters of AV 109. In certain examples, the transport facilitation system 100 can store AV parameter logs 134 in the database 130 that indicates all the adjustable parameters (e.g., adjustable seat parameters) of AVs in the fleet 190. The configuration engine 140 can lookup 142 the adjustable seat parameters of AV 109, map the user attributes 153 to various adjustments to a seat of AV 109 to maximize user comfort, generate the AV configuration set 188 to include the seat adjustments, and transmit the AV configuration set 188 to AV 109 via the vehicle interface 105 while AV 109 is en route to pick up the requesting user.

In certain implementations, the selection engine 135 can further assign a particular seat of AV 109 to the requesting user. In such implementations, the configuration engine 140 can further indicate in the vehicle configuration set 188, the particular seat assigned to the requesting user (e.g., the front right seat). Once AV 109 receives the vehicle configuration set 188, AV 109 can execute the configurations for the particular seat assigned to the requesting user prior to arriving at the pick-up location. Additionally, the selection engine 135 can generate and transmit a confirmation 199 to the requesting user's device 195. In certain aspects, the confirmation 199 can indicate various attributes of AV 109 (or other selected service vehicle that services the user's pick-up request 197), such as the vehicle type, color, year, license plate number, etc. The confirmation 199 can be generated on a user interface of the designated application 185 of the user device 195, and can further include data indicating the seat assigned to the requesting user. In certain aspects, the requesting user can accept the confirmation 199, or reject the confirmation—in which case the selection engine 135 can find an alternative vehicle and the configuration engine 140 can generate a new vehicle configuration set 188 for the alternative vehicle accordingly. Thus, as the selected AV 109 rendezvous with the requesting user, the requesting user can be presented with information indicating the configured seat based on the accelerometer data 181 and GPS data 183 from the user's own device 195, and the seat can be preconfigured for the user to optimize comfort.

Additionally or alternatively, the designated application 185 on the user device 195 can generate a preference menu 186 to enable the user to input preferences, such as climate control settings, seat temperature settings, radio station settings, a preferred seat in the selected AV 109 (e.g., for carpooling or vanpooling), lighting settings, home page settings for an interior display, moon roof or sunroof settings (e.g., open or closed), window settings, ride control settings (e.g., sport mode or cautious mode autonomous driving), high level seat adjustment settings (e.g., upright or relaxed positions), and the like. In some examples, the preference menu 186 can be generated on the display screen of the user device 195 in response to transmitting a pick-up request 197.

In variations, the preference menu 186 can be customized based on the configurable parameters of the AV selected by the AV selection engine 135. Accordingly, upon selecting AV 109 to service the pick-up request 197, the configuration engine 140 can access the AV parameter log 134 for AV 109 to determine its configurable parameters (e.g., whether AV 109 has satellite radio, a sunroof, 360 degree seating configurations, etc.), and the transport facilitation system 100 can generate the preference menu 186 for the requesting user based on the configurable parameters of AV 109. The user may interact with the preference menu 186, and transmit the selections 191 back the transport facilitation system 100, and the configuration engine 140 can generate the vehicle configuration set 188 based on the selections on the preference menu 186, and transmit the vehicle configuration set 188 to AV 109, as described herein.

As further described, the vehicle configuration set 188 can comprise a set of configuration instructions to configure a number of adjustable components of the selected service vehicle for the user prior to the selected service vehicle arriving at the pick-up location. Accordingly, the vehicle can adjust, through automation, one or more components in accordance with the vehicle setup preferences while the service vehicle is traveling to the pickup location. Additionally, or alternatively, the transport facilitation system 100 can further communicate instructions to the service vehicle (e.g., AV 109) to extend or delay a route taken by the service vehicle to reach the pickup location in order to operate at least one vehicle setup preference in accordance with the comfort profile 137 or the configuration set 188.

Additionally or alternatively, the preference menu 186 can be generated on the designated application 185 at any time to enable the user the generally select certain preferences provided herein. The preference selections 191 (e.g., seat position information, temperature settings, etc.) can be transmitted to a log manager 125 of the transport facilitation system 100 which can generate preference log updates 128 based on the selections 191 for the user's comfort profile 137. As provided herein, the database 130 can store comfort profiles 137 for users of the transportation arrangement service that can indicate the general preferences of the user, and can be accessed by the configuration engine 140 to, at least partially, generate the AV configuration set 188 for execution by the selected AV 109 while en route to the pick-up location. In some examples, the transport facilitation system 100 can communicate to the user that one or more features for implementing the user's comfort profile 137 is not available on the selected service vehicle (e.g., AV 109).

Accordingly, the transport facilitation system 100 can manage rider preference logs 132 corresponding to users of the transportation arrangement service. Each of the rider preference logs 132 can include a preference or comfort profile 137 for a particular user, and can be categorized by the transport facilitation system 100 using unique identifiers 136 associated with the user devices 195. When a particular pick-up request 197 is received, the configuration engine 140 can utilize the unique identifier 136 for the user device 195, and included with the pick-up request 197, to identify a comfort profile 137 in a matching rider preference log 132. Furthermore, over time, the transport facilitation system 100 can determine (e.g., via machine learning techniques) a set of preferences for a particular user.

In one example, after the requesting user has been picked up by a selected AV 109 from the fleet 190, the selected AV 109 (or other selected service vehicle, such as a human driven car or van) can transmit AV data 196 back to the transport facilitation system 100. Among other data items, the AV data 196 can include configuration or adjustment data 163 indicating user adjustments to the interior components (e.g., radio, seat positioning, configuration, and adjustments, temperature control, etc.). The log manager 125 can parse through the AV data 196 and log the adjustment data 163 in the rider preference log 132 of that particular user. Over time, the adjustment data 163—included in the AV data 196 received from selected AVs that service pick-up requests for that user—can indicate certain learned preferences of the user. In certain implementations, the transport facilitation system 100 can include a pattern recognition engine 160 that can analyze the adjustment data 163 for the particular user over a time frame (or over the course of n rides), and identify distinct preferences in the adjustment data 163. When a particular preference pattern is identified in the adjustment data 163 by the pattern recognition engine 160, the pattern recognition engine 160 can generate a comfort profile update 169 for the comfort profile 137 of the particular user to include the learned preference.

For example, over the course of n rides (e.g., fifteen, twenty, or fifty rides), the adjustment data 163 provided by servicing AVs can indicate that the user typically selects a certain radio station, adjusts the climate control system to a specified temperature range, prefers a certain set of seat adjustments, and/or accesses a certain set of software apps or browses a certain set of webpages. Individual selections and adjustments may be logged by the log manager 125 as preference log updates 128. Over time, the pattern recognition engine 160 can identify patterns, or score certain preferences via a scoring technique. Once a particular preference achieves a certain threshold (e.g., crosses a certainty probability threshold or score), the pattern recognition engine 160 can edit the comfort profile 137 of the user by generating a profile update 169 reflecting the determined preference. Thereafter, when the user requests pick-up, the configuration engine 140 can generate the AV configuration set 188 to include the preference determined by the pattern recognition engine 160 in the profile update 169. This learned preference can be a particular seat arrangement, a temperature setting, a radio station setting, and/or other adjustments, configurations, or other settings described herein.

Further, after each AV ride, the designated application 185 on the user device 195 can enable the user to provide feedback 193 regarding the ride. In certain implementations, the feedback 193 can include a simple rating system (e.g., between one to five stars) that the user can utilize to rate user experience for the ride. The pattern recognition engine 160 can receive the feedback 193 from the user device 195 to attempt to make correlations between the user's experience for a particular ride, and certain occurrences or ride characteristic during the ride itself. As described above, the transport facilitation system 100 can receive AV data 196 from servicing AVs while servicing pick-up requests. In addition to including adjustment data 163, the AV data 196 can indicate various control commands and sensor data (e.g., accelerometer data, image data, control system mode, etc.) that can indicate a potential correlation with a particular rating.

For example, AVs in the fleet 190 can operate in certain modes while remaining within legal and safety constraints. In some examples, the pattern recognition engine 160 can correlate (e.g., over the course of several rides) high ratings with cautious travel for a nervous rider. In some examples, once the correlation reaches a predetermined threshold (e.g., 75% certainty) the pattern recognition engine 160 can generate a profile update 169 for the nervous rider's comfort profile 137 indicating a mandatory requirement that selected AVs only travel according to a certain ride characteristic, such as a high caution mode when servicing requests for the nervous rider. Thus, when the nervous rider submits a pick-up request 197 and AV 109 is selected to service the request 197 by the selection engine 135, the configuration engine 140 can perform a lookup 142 in the nervous rider's comfort profile 137 to identify vehicle setup preferences, such as the AV setup preferences 133 of the nervous rider. As described herein, the AV setup preferences 133 can also be directly inputted by the nervous rider in a preference menu 186 before or after submitting the pick-up request 197. Furthermore, the comfort profile 137 for the nervous rider can indicate other configuration preferences, such as radio settings, seat configuration settings, temperature settings, etc.—and the learned preference that the nervous rider prefers a cautious AV ride. The configuration engine 140 can generate and transmit the vehicle configuration set 188 to include an instruction for AV 109 to operate in a high caution mode (e.g., drive at slower speeds and implement smooth braking, acceleration and steering) when driving the nervous rider from the pick-up location to the rider's destination.

More generally, AV data 196 (or other service vehicle data) from selected AVs providing transportation to a particular user can be analyzed by the pattern recognition engine 160 in light of feedback 193 (e.g., user experience ratings) provided by that particular user. The feedback 193 need not be limited to only ratings data, but can include voluntary comments and/or survey data as well. In some aspects, the pattern recognition engine 160 can be triggered to analyze AV data 196 for a particular trip when the user submits a rating below a certain threshold (e.g., two out of five stars). The pattern recognition engine 160 can analyze the AV data 196 for anomalous events, instances, and/or ride characteristics that are potentially responsible for or contributed to the low rating.

For example, the pattern recognition engine 160 can identify accelerometer data in the AV data 196 that indicates hard braking on a number of occasions. As another example, the pattern recognition engine 160 can further determine a time versus distance delta between pick-up and the drop-off that may indicate whether the AV traveled too quickly or too slowly in transporting the user. Over the course of n rides, the pattern recognition engine 160 may identify one or more potential causes for low ratings indicated by the user by analyzing the AV data 196 for each trip. As provided herein, once the potential causes achieve a certain threshold (e.g., 75% probability of being a cause for the low rating), the pattern recognition engine 160 can generate a profile update 169 to edit the comfort profile 137 of the user to mitigate or alleviate the cause in future trips. Such potential causes can include patterns of anomalous braking, swerving, and/or acceleration (e.g., as measured above a certain g-force threshold), overly cautious or overly assertive driving (e.g., driving in a normal mode versus a cautious mode versus a high caution mode), and the like. Thus, the comfort profile 137 for the user can also include negative preferences, such as a negative preference that prevents a selected AV 109 from operating in a high caution mode for the user, which can cause the selected AV 109 to optimize trip time.

Along these lines, the pattern recognition engine 160 can analyze adjustment data 163 over time (or over the course of n trips by the user) to identify ranges or bounds for certain component parameters. For example, a user may never adjust the air temperature of the interior above seventy degrees, or may never adjust the fore-aft parameter of the seat beyond a certain forward position. The pattern recognition engine 160 can compile such adjustment data 163 in the user's preference log 132, and can calculate a probability (e.g., for each successive trip) that the user will not exceed these determined ranges or boundaries. Once the calculated probability reaches a certain threshold (e.g., 90% certainty probability), the pattern recognition engine 160 can amend the user's comfort profile 137 with a profile update 169 indicating the set ranges or bounds. Thus, for subsequent rides, the configuration engine 140 can refer to the set ranges and bounds of the user's comfort profile 137 to determine whether any adjustable parameters of the selected AV 109 are outside such ranges or bounds. If so, the configuration engine 140 can generate the AV configuration set 188 to include an adjustment command for the selected AV 109 to adjust those parameters to be within the ranges or bounds indicated in the user's comfort profile 137.

Accordingly, a user of the transportation arrangement service managed by the transport facilitation system 100 can input initial preferences 191 prior to using the service, or after each transmitted pick-up request 197 via the preference menu 186 on the designated application 185. Additionally or alternatively, the data analyzer 150 of the transport facilitation system 100 can automatically determine or estimate, based on accelerometer data 181 and GPS data 183 from the user's device 195, the user's attributes 153, such as the user's height, weight, body type, leg length, femur length, posture, and the like. The configuration engine 140 can generate the configuration set 188 to include seat adjustment commands based on these determined attributes. Additionally or alternatively still, the user can provide feedback 193 or make adjustments during AV rides, which can trigger pattern recognition that can edit or amend the user's comfort profile 137 accordingly. The configuration engine 140 can generate an configuration set 188 based on the user's comfort profile 137, and transmit the configuration set 188 to the selected AV 109 (or selected human-driven service vehicle) which can configure the interior components prior to picking up the user accordingly. In certain implementations, the configuration engine 140 can further identify a particular seat within the selected AV 109 or service vehicle to be configured for the user, and the selection engine 135 can transmit a confirmation 199 to the user device 195 indicating the assigned seat. In one example, the transport facilitation system 100 can determine a seat assignment within the service vehicle for the user based at least in part on the comfort profile 137 of the user. Additionally, the transport facilitation system 100 can communicate the seat assignment to the user device 195 prior to pick-up. In further implementations, the transport facilitation system 100 can select a route for the service vehicle to the pickup location based on the seat assignment of the user.

In some examples, the transport facilitation system 100 can transmit route commands to route the selected AV 109 (or service vehicle) such that the AV 109 (or service vehicle) picks up the user with the assigned seat corresponding to the road curb at the pick-up location (e.g., the assigned seat being on the side of the AV 109 in which the user will enter from a sidewalk or curb). In further examples, the configuration set 188 can further include audio adjustment commands to configure an audio focal point of the AV 109 to match the assigned seat of the user. In still further examples, the AV data 196 can include seat sensor data indicating a position of the user within the AV 109 (e.g., when the user changes seats). In response, the configuration engine 140 can transmit an audio configuration command to adjust the audio focal point based on the position of the user within the AV 109. In examples described below, one or more automatic configurations described with respect to FIG. 1, may be determined, generated, and executed by the selected AV 109 itself.

Figure 2:
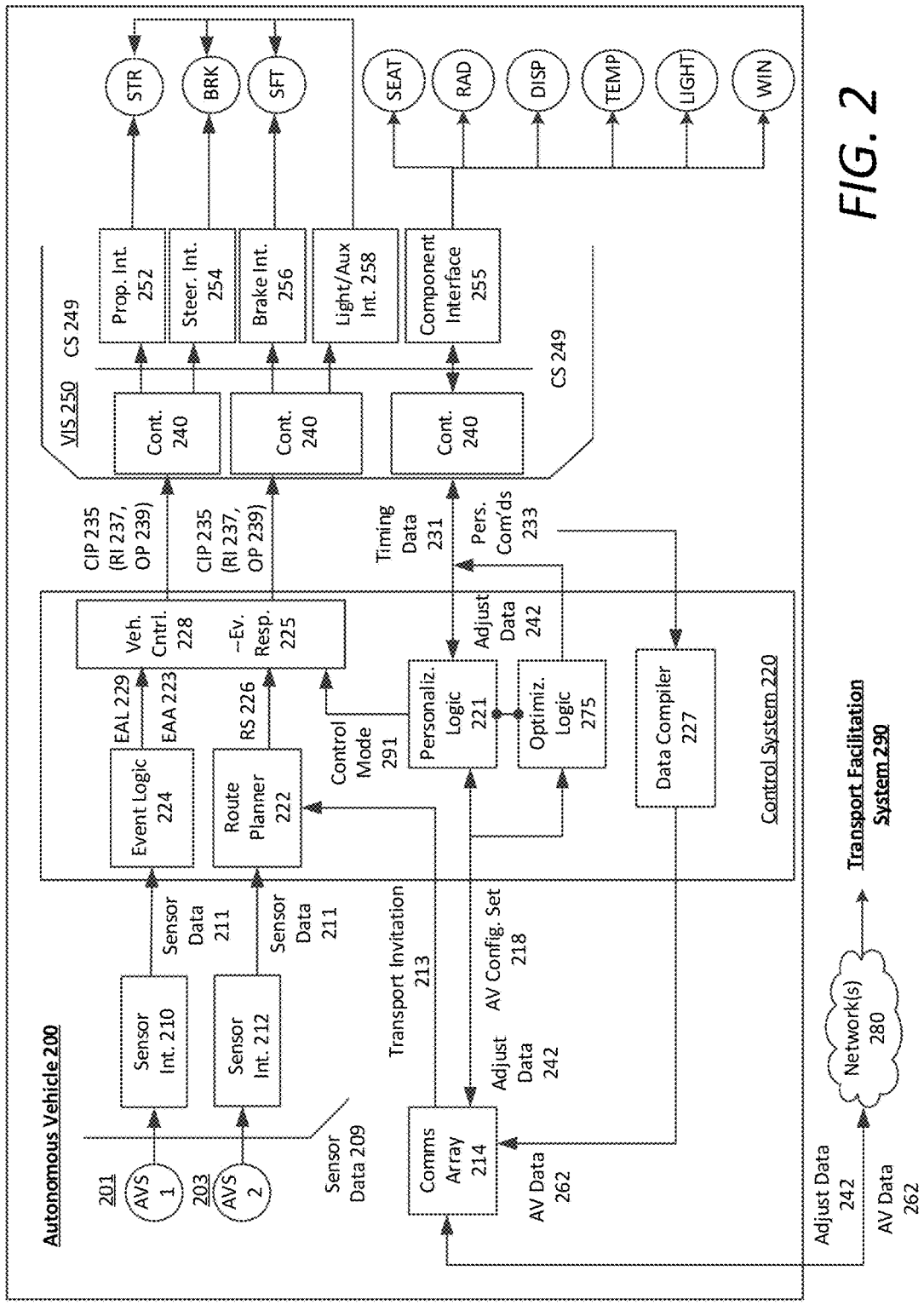
FIG. 2 is a block diagram illustrating an example AV implementing a control system, as described herein.

FIG. 2 is a block diagram illustrating an example AV implementing a control system, as described herein. In an example of FIG. 2, a control system 220 can be used to autonomously operate the AV 200 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake, and operate lighting components. Some variations also recognize that an autonomous-capable vehicle can be operated either autonomously or manually.

One or more components described with respect to FIG. 2 may be attributed to a human-driven service vehicle, such as a car or van. For example, the service vehicle can include a wireless communication interface to communicate with a backend, transport facilitation system 100, such as those described with respect to FIG. 1. Furthermore, the service vehicle can include a number of adjustable components that affect a seating or an environment of the vehicle, and a controller to control a setting for each of the adjustable components (e.g., lighting, seat adjustments, radio, etc.). Thus, as described herein in with respect to the AV 200, the controller of the service vehicle (whether an AV or a human-driven vehicle) can receives a set of instructions from a network service (e.g., transportation arrangement service provided by the transport facilitation system 100) via the wireless communication interface, and autonomously implement, while the vehicle is in motion, a comfort profile in at least one passenger zone about one seat of the vehicle, by adjusting a setting of one or more of the components in accordance with the set of instructions.

In one implementation, the control system 220 can utilize specific sensor resources in order to intelligently operate the vehicle 200 in most common driving situations. For example, the control system 220 can operate the vehicle 200 by autonomously steering, accelerating, and braking the vehicle 200 as the vehicle progresses to a destination. The control system 220 can perform vehicle control actions (e.g., braking, steering, accelerating) and route planning using sensor information, as well as other inputs (e.g., transmissions from remote or local human operators, network communication from other vehicles, etc.).

In an example of FIG. 2, the control system 220 includes a computer or processing system which operates to process sensor data that is obtained on the vehicle with respect to a road segment upon which the vehicle 200 operates. The sensor data can be used to determine actions which are to be performed by the vehicle 200 in order for the vehicle 200 to continue on a route to a destination. In some variations, the control system 220 can include other functionality, such as wireless communication capabilities, to send and/or receive wireless communications with one or more remote sources. In controlling the vehicle 200, the control system 220 can issue instructions and data, shown as commands 235, which programmatically control various electromechanical interfaces of the vehicle 200. The commands 235 can serve to control operational aspects of the vehicle 200, including propulsion, braking, steering, and auxiliary behavior (e.g., turning lights on). In examples described herein, the commands 235 can further serve to control configurable interior systems of the AV 200 via a component interface 255, such as seating configurations, seat positioning, seat adjustment, seat heating or cooling, radio station selections, a display setup, a climate control system, an interior lighting system, windows, and/or a sunroof or moon roof.

In examples described herein, the AV 200 can include a wireless communication interface to communicate with the backend, transport facilitation system 100 described with respect to FIG. 1.

The AV 200 can be equipped with multiple types of sensors 201, 203 which can combine to provide a computerized perception of the space and environment surrounding the vehicle 200. Likewise, the control system 220 can operate within the AV 200 to receive sensor data 211 from the collection of sensors 201, 203, and to control various electromechanical interfaces for operating the vehicle 200 on roadways.

In more detail, the sensors 201, 203 operate to collectively obtain a complete sensor view of the vehicle 200, and further to obtain situational information proximate to the vehicle 200, including any potential hazards proximate to the vehicle 200. By way of example, the sensors 201, 203 can include multiple sets of cameras sensors 201 (video cameras, stereoscopic pairs of cameras or depth perception cameras, long range cameras), remote detection sensors 203 such as provided by radar or LIDAR, proximity or touch sensors, and/or sonar sensors (not shown).

Each of the sensors 201, 203 can communicate with the control system 220 utilizing a corresponding sensor interface 210, 212. Each of the sensor interfaces 210, 212 can include, for example, hardware and/or other logical components which are coupled or otherwise provided with the respective sensor. For example, the sensors 201, 203 can include a video camera and/or stereoscopic camera set which continually generates image data of an environment of the vehicle 200. As an addition or alternative, the sensor interfaces 210, 212 can include a dedicated processing resource, such as provided with a field programmable gate array ("FPGA") which can, for example, receive and/or process raw image data from the camera sensor.

In some examples, the sensor interfaces 210, 212 can include logic, such as provided with hardware and/or programming, to process sensor data 209 from a respective sensor 201, 203. The processed sensor data 209 can be outputted as sensor data 211. As an addition or variation, the control system 220 can also include logic for processing raw or pre-processed sensor data 209.

According to one implementation, the vehicle interface subsystem 250 can include or control multiple interfaces to control mechanisms of the vehicle 200. The vehicle interface subsystem 250 can include a propulsion interface 252 to electrically (or through programming) control a propulsion component (e.g., an accelerator pedal), a steering interface 254 for a steering mechanism, a braking interface 256 for a braking component, and a lighting/auxiliary interface 258 for exterior lights of the vehicle. According to implementations described herein, control signals 249 can further be transmitted to a component interface 255 of the vehicle interface subsystem 250 to control various components of the AV 200 based on user preferences or attributes. The vehicle interface subsystem 250 and/or the control system 220 can further include one or more controllers 240 which can receive commands 233, 235 from the control system 220. The commands 235 can include route information 237 and operational parameters 239—which specify an operational state of the vehicle 200 (e.g., desired speed and pose, acceleration, etc.). The commands can further include personalization commands 233 to cause the controller 240 to configure a number of adjustable components of the AV 200 via the component interface 255.

The controller(s) 240 can generate control signals 249 in response to receiving the commands 233, 235 for one or more of the vehicle interfaces 252, 254, 255, 256, 258. The controllers 240 can use the commands 235 as input to control propulsion, steering, braking, and/or other vehicle behavior while the AV 200 follows a current route. Thus, while the vehicle 200 actively drives along the current route, the controller(s) 240 can continuously adjust and alter the movement of the vehicle 200 in response to receiving a corresponding set of commands 235 from the control system 220. Absent events or conditions which affect the confidence of the vehicle 220 in safely progressing along the route, the control system 220 can generate additional commands 235 from which the controller(s) 240 can generate various vehicle control signals 249 for the different interfaces of the vehicle interface subsystem 250.

According to examples, the commands 235 can specify actions to be performed by the vehicle 200. The actions can correlate to one or multiple vehicle control mechanisms (e.g., steering mechanism, brakes, etc.). The commands 235 can specify the actions, along with attributes such as magnitude, duration, directionality, or other operational characteristics of the vehicle 200. By way of example, the commands 235 generated from the control system 220 can specify a relative location of a road segment which the AV 200 is to occupy while in motion (e.g., change lanes, move into a center divider or towards shoulder, turn vehicle, etc.). As other examples, the commands 235 can specify a speed, a change in acceleration (or deceleration) from braking or accelerating, a turning action, or a state change of exterior lighting or other components. The controllers 240 can translate the commands 235 into control signals 249 for a corresponding interface of the vehicle interface subsystem

250. The control signals 249 can take the form of electrical signals which correlate to the specified vehicle action by virtue of electrical characteristics that have attributes for magnitude, duration, frequency or pulse, or other electrical characteristics.

In an example of FIG. 2, the control system 220 can include a route planner 222, event logic 224, personalization logic 221, optimization logic 275, and a vehicle control 228. The vehicle control 228 represents logic that converts alerts of event logic 224 ("event alert 229") into commands 235 that specify a set of vehicle actions.

Additionally, the route planner 222 can select one or more route segments 226 that collectively form a path of travel for the AV 200 when the vehicle 200 is on a current trip (e.g., servicing a pick-up request). In one implementation, the route planner 222 can specify route segments 226 of a planned vehicle path which defines turn by turn directions for the vehicle 200 at any given time during the trip. The route planner 222 may utilize the sensor interface 212 to receive GPS information as sensor data 211. The vehicle control 228 can process route updates from the route planner 222 as commands 235 to progress along a path or route using default driving rules and actions (e.g., moderate steering and speed).

In certain implementations, the event logic 224 can trigger a response to a detected event. A detected event can correspond to a roadway condition or obstacle which, when detected, poses a potential hazard or threat of collision to the vehicle 200. By way of example, a detected event can include an object in the road segment, heavy traffic ahead, and/or wetness or other environmental conditions on the road segment. The event logic 224 can use sensor data 211 from cameras, LIDAR, radar, sonar, or various other image or sensor component sets in order to detect the presence of such events as described. For example, the event logic 224 can detect potholes, debris, objects projected to be on a collision trajectory, and the like. Thus, the event logic 224 can detect events which enable the control system 220 to make evasive actions or plan for any potential hazards.

When events are detected, the event logic 224 can signal an event alert 229 that classifies the event and indicates the type of avoidance action to be performed. Additionally, the control system 220 can determine whether an event corresponds to a potential incident with a human driven vehicle, a pedestrian, or other human entity external to the AV 200. In turn, the vehicle control 228 can determine a response based on a score or classification of the event. Such response can correspond to an event avoidance action 223, or an action that the vehicle 200 can perform to maneuver the vehicle 200 based on the detected event and its score or classification. By way of example, the vehicle response can include a slight or sharp vehicle maneuvering for avoidance using a steering control mechanism and/or braking component. The event avoidance action 223 can be signaled through the commands 235 for controllers 240 of the vehicle interface subsystem 250.

When an anticipated dynamic object of a particular class does in fact move into position of likely collision or interference, some examples provide that event logic 224 can signal the event alert 229 to cause the vehicle control 228 to generate commands 235 that correspond to an event avoidance action 223. For example, in the event of a bicycle crash in which the bicycle (or bicyclist) falls into the path of the vehicle 200, the event logic 224 can signal the event alert 229 to avoid the collision. The event alert 229 can indicate (i) a classification of the event (e.g., "serious" and/or "immediate"), (ii) information about the event, such as the type of object that generated the event alert 229, and/or information indicating a type of action the vehicle 200 should take (e.g., location of object relative to path of vehicle, size or type of object, etc.).

According to examples described herein, AV 200 can include a communications array 214 to communicate over one or more networks 280 with a backend, transport facilitation system 290, such as the transport facilitation system 100 described with respect to FIG. 1. When the AV 200 is selected to service a pick-up request, the communications array 214 can receive a transport invitation 213 from the transport facilitation system 290 to service the pick-up request and drive to a pick-up location to rendezvous with the requesting user. In many aspects, the transport invitation 213 can be transmitted to the route planner 222 in order to autonomously drive the AV 200 to the pick-up location. In conjunction with or subsequent to receiving the transport invitation 213, the communications array 214 can receive an AV configuration set 218 from the transport facilitation system 290 to personalize the various configurable components of the AV 200 for the upcoming rider.

The AV configuration set 218 can be processed by the personalization logic 221 of the control system 221 which can generate a set of personalization commands 233 for execution by a controller 240 for the component interface 255. In certain implementations, the personalization logic 221 can be executed by the control system 220 in concert with optimization logic 275 in order to execute the personalization commands 233 in a timely manner. Such timing characteristics may be beneficial in the overall power and energy optimization and management by the AV 200. As an illustrative example, the AV 200 may operate in a hot, desert climate and receive a transport invitation 213 for a pick-up location several miles (e.g., ten miles) from a current location. The AV configuration set 218 may indicate a user preference for a cool interior that requires energy intensive use of the AV's air conditioning system. The optimization logic 275 can generate timing data 231 for the controller 240 to execute the climate control aspects of the personalization commands 233 such that the cool desired temperature is achieved just prior to the AV 200 arriving at the pick-up location. Thus, while the controller 240 can execute personalization commands 233 for certain components immediately (e.g., seat configuration and positioning), the controller 240 can execute other personalization commands 233 as constrained by the timing data 231 generated by the optimization logic 275 (e.g., the climate control system, audio and display systems, etc.).

Execution of the personalization commands 233 by the controller 240 can configure AV components—such as the audio system (e.g., radio station(s), volume, audio focal point), the display system (e.g., displaying a home page or having desired content pre-set for viewing), windows/sunroof (e.g., open, partially open, or closed), lighting system (e.g., mood lighting, reading lights, colored lights, and/or brightness), seat configuration (e.g., front seat(s) rotated rearwards for multiple passengers), seat positioning (e.g., adjustments to fore-aft position, a backrest angle, a thigh extension length, a headrest angle, a headrest level, a lumbar position, a seat depth, a seat height, an upper seat tilt angle, or shoulder support), seat temperature, mirror positions, and/or a climate control system (e.g., air temperature, and temperature focus based on user location within the AV 200). As described, the personalization commands 233 for any one of the foregoing configurable components can be time-constrained by the optimization logic 275 in order to optimize energy usage by the AV 200.

In certain aspects, the AV configuration set 218 can also include a control mode preference for high level operation of the AV 200 through road traffic. For example, the AV configuration set 218 can indicate a preferred mode (e.g., a high caution mode for an elderly rider) or a negative preference (e.g., avoid high caution mode for a work commuter). The personalization logic 221 can submit the control mode 291 information to the vehicle control 228, which can adjust general control parameters in operating the braking, acceleration, and steering systems of the AV 200. For example, a preferred high caution mode can cause the vehicle control 228 to increase relative braking distances and/or provide more gentle acceleration to increase rider comfort.

As the AV 200 transports the rider to a specified destination, the rider may make adjustments to the various configurable components that, over time or over the course of n trips, may indicate certain preference patterns. Thus, the personalization logic 221 can also monitor such adjustment data 242, and transmit the adjustment data 242 back to the transport facilitation system 290 for pattern analysis, as described herein.

In some examples, the control system 220 can further include a data compiler 227 that can compile AV data 262 that indicates information directed to trips that can include potential causes of a high or low rating provided by a rider. In certain aspects, the data compiler 227 can be programmed to identify anomalous instances, such as those correlated to event avoidance actions 223. Additionally or alternatively, over time or over the course of n trips, the AV data 262—included with AV data from various other servicing AVs providing transport for the rider—can include information that indicates general ride preferences of a user without the user providing explicit feedback. Thus, the AV data 262 can be streamed or periodically transmitted back to the transport facilitation system 290 for pattern analysis, as described herein.

Figure 3:
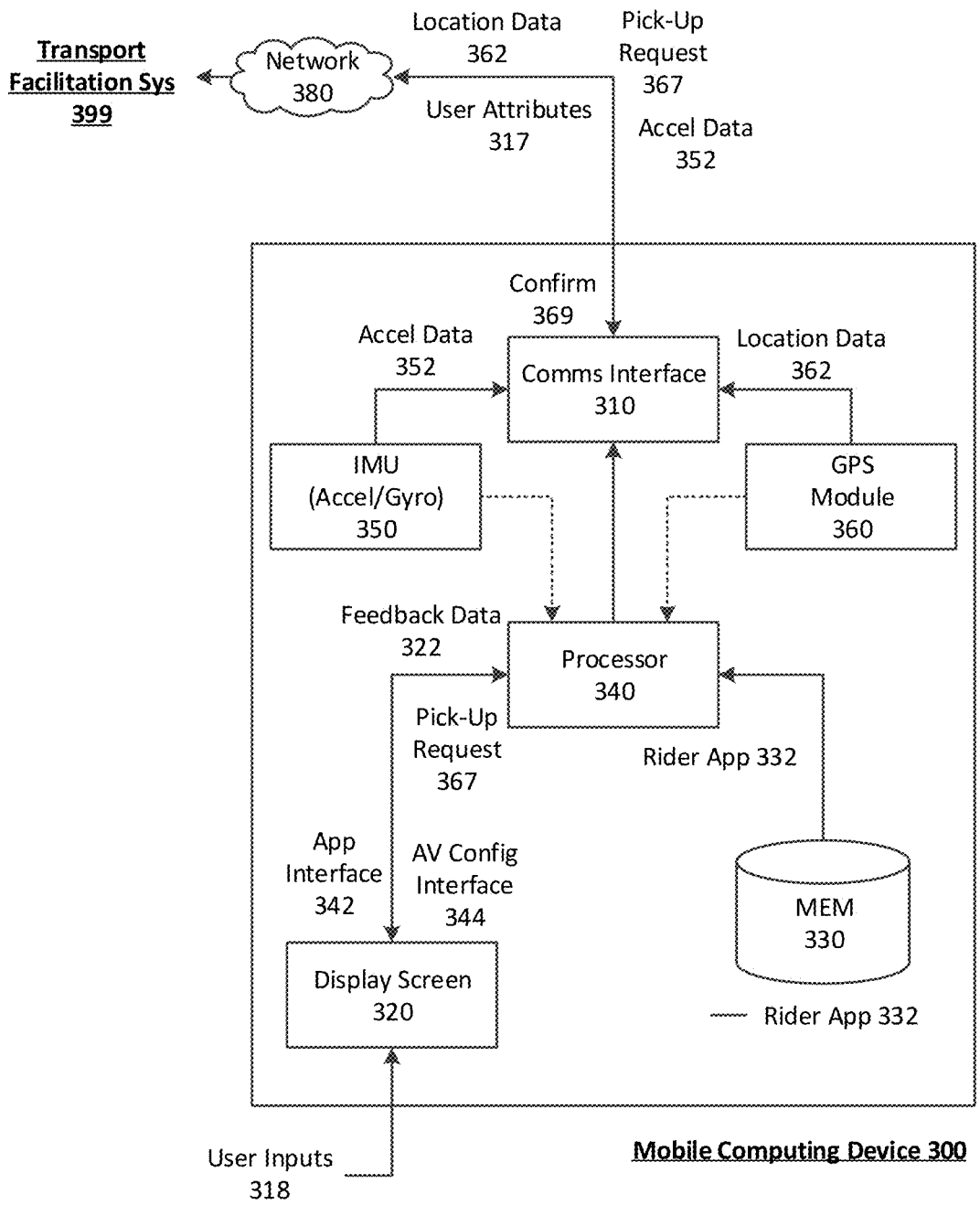
FIG. 3 is a block diagram illustrating an example mobile computing device executing a designated application for a transport arrangement service, as described herein.

FIG. 3 is a block diagram illustrating an example mobile computing device executing a designated application for a transport arrangement service, as described herein. The mobile computing device 300 can store a designated application (e.g., a rider app 332) in a local memory 330. In response to a user input 318, the rider app 332 can be executed by a processor 340, which can cause an app interface 342 to be generated on a display screen 320 of the mobile computing device 330. The app interface 342 can enable the user to, for example, check current price levels and availability for the transportation arrangement service. In various implementations, the app interface 342 can further enable the user to select from multiple ride services, such as a carpooling service, a regular rider service, a professional rider service, a van transport service, a luxurious ride service, and the like. Example services that may be browsed and requested can be those services provided by UBER Technologies, Inc. of San Francisco, Calif.

The user can generate a pick-up request 367 via user inputs 318 provided on the app interface 342. For example, the user can select a pick-up location, view the various service types and estimated pricing, and select a particular service for transportation to an inputted destination. In many examples, the user can input the destination prior to pick-up. The processor 340 can transmit the pick-up request 367 via a communications interface 310 to the backend transport facilitation system 399 over a network 380. In response, the mobile computing device 300 can receive a confirmation 369 from the transport facilitation system 399 indicating the selected AV that will service the pick-up request 367 and rendezvous with the user at the pick-up location.

In certain implementations, the confirmation 369 and or the pick-up request 367 can trigger the mobile computing device 300 to begin transmitting accelerometer data 352 and location data 362 from an inertial measurement unit 350 and GPS unit or module 360 of the mobile computing device 300. The transport facilitation system 399 can analyze the location data 362 and the accelerometer data 352 to determine a set of user attributes 317 for the user in order to configure a seat of the selected AV accordingly, as described herein. In variations, the processor 340 of the mobile computing device 300 can receive and analyze the accelerometer data 352 and the location data 362 and determine or estimate the set of user attributes 317. In doing so, the processor 340 can analyze peak signatures in the accelerometer data 352 and correlate such signatures to a distance walked from the location data 362 to determine or estimate such attributes as a height, weight, gait pattern, body type, posture, leg length, femur length, and/or torso length. Once calculated, the processor can transmit the user attributes 317 to the transport facilitation system 399 over the network 380 in order to enable the transport facilitation system 399 configure the AV seat accordingly.

In one or more examples, the rider app 332 can also generate an AV configuration interface 344 so that the user can set preferences and/or configure the interior components of the AV prior to pick-up. In one aspect, the AV configuration interface 344 can be generated automatically after the pick-up request 367 is transmitted. In variations, the AV configuration interface 344 can be initiated via user input 318 on the app interface 342. The user can utilize the AV configuration interface 344 to set preferences for air temperature, high level seating preferences (e.g., relaxed versus upright), seat temperature, radio station settings, display settings (e.g., a particular program or content setup and/or a home page), interior lighting, a travel mode (e.g., increasing ride comfort versus minimizing travel time), and the like.

In various examples, after each ride, the app interface 342 can enable the user to provide feedback 322 for the ride. The feedback 322 can include an overall user experience rating for the ride (e.g., between 1 and 5 stars), and/or can include a survey or comments section to provide additional feedback. The processor 340 can transmit the feedback data 322 to the transport facilitation system 399 for AV data analysis or preference pattern recognition.

Methodology

In the below descriptions of FIGS. 4A, 4B, 5A, 5B, and 6, reference may be made to reference characters representing like features from FIGS. 1 through 3. Furthermore, the processes described below in connection with FIGS. 4A and 4B, and FIGS. 5A and 5B, may be performed by an example transport facilitation system 100 as shown and described with respect to FIG. 1. Further still, the operations illustrated in FIGS. 4A and 4B—and FIGS. 5A and 5B as described below—need not be performed in any particular order. Accordingly, certain processes or operation sets discussed below and illustrated in the flow chart examples of FIGS. 4A, 4B, and FIGS. 5A and 5B can be performed prior to, concurrently with, or subsequent to other processes or operation sets—as illustrated by reference circles "A" and "B" in FIGS. 4A and 4B, and FIGS. 5A and 5B.

Additionally, the example transport facilitation system 100 performing the operations of FIGS. 4A and 4B, and FIGS. 5A and 5B, can store preference logs 132 and comfort profiles 137 that include data indicating potential preferences for users (e.g., implementing machine learning over time) and/or comfort or preference settings initially determined by the transport facilitation system 100 (e.g., using accelerometer and location data from the rider's mobile computing device 195), inputted by the user (e.g., via a preference menu 186), or determined over time by the transport facilitation system 100 (e.g., via machine learning and/or pattern recognition).

Figure 4A:
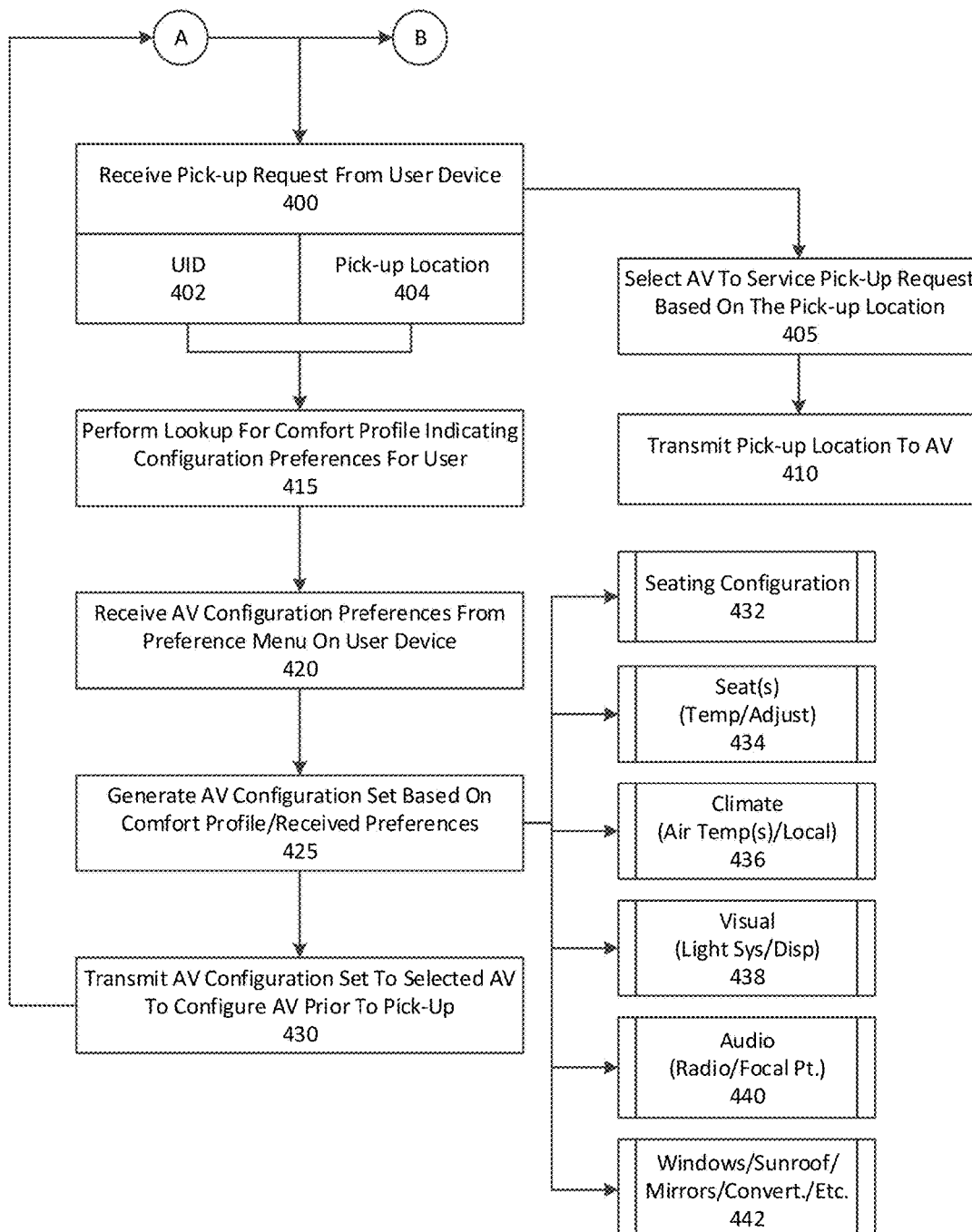
FIGS. 4A and 4B are flow charts describing example methods of utilizing a comfort profile for configuring an AV for a user, according to examples described herein.
Figure 4B:
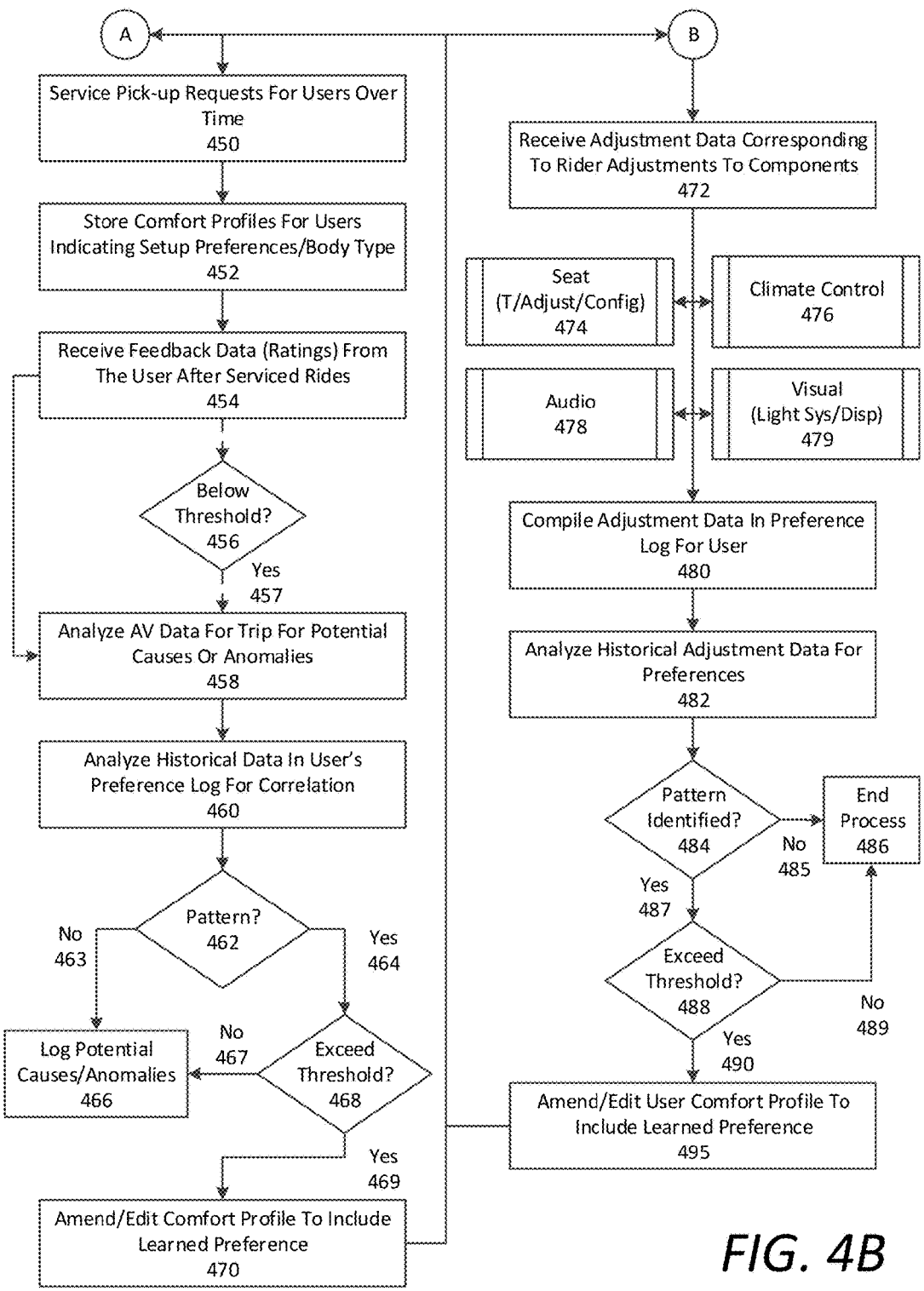

FIGS. 4A and 4B are flow charts describing example methods of utilizing a comfort profile for configuring an AV for a user, according to examples described herein. Referring to FIG. 4A, the transport facilitation system 100 can receive a pick-up request 197 from a user device 195 (400). In many aspects, the pick-up request 197 can indicate a unique identifier 136 for the user (402) (e.g., an application identifier, account identifier, and/or phone identifier) and a pick-up location (404). In certain aspects, the transport facilitation system 100 can utilize the pick-up location to select an AV 109 to service the pick-up request (405). For example, the AV 109 may be selected by the transport facilitation system 100 based on proximity to the pick-up location, to estimated time of arrival to the pick-up location (e.g., determined by traffic conditions). In variations, the transport facilitation system 100 can filter the AV selection based on a preferred vehicle type or service type indicated by the user (e.g., via direct input on the designated app 185 or via lookup 142 in the comfort profile 137). Once the AV 109 is selected (and the invitation 182 to service the request is accepted), the transport facilitation system 100 can transmit the pick-up location to the AV 109 to enable the rendezvous (410).

Using the unique identifier 136, the transport facilitation system 100 can perform a lookup 142 in the database 130 for the requesting user's comfort profile 137 (415). As described herein, the comfort profile 137 can indicate AV configuration or setup preferences 133 for the requesting user, as described herein. Additionally or alternatively, the transport facilitation system 100 can receive AV configuration preferences from a preference menu 186 on the user device 195 (420). For example, the user can input setup preferences indicating high level preferences (e.g., warm or cool interior temperature, relaxed or upright seating, etc.) when setting up an account with the transportation arrangement service, or after each pick-up request 197. Based on the configuration preferences in the comfort profile 137 and/or received from the user device 195, the transport facilitation system 100 can generate an AV configuration set 188 (425).

As described herein, the AV configuration set 188 can include adjustment parameters for various configurable components of the selected AV 109. For example, the AV configuration set 188 may indicate a seating configuration (432) that the AV 109 is to execute prior to arriving at the pick-up location. The AV 109 may include front seat motors that can pivot the front seats rearward. Thus, for a user that requests transportation for a group, the user can input the seating configuration preference into the preference menu 186 to pivot the front seats rearward. In response, the transport facilitation system 100 can incorporate the seating configuration preference into the AV configuration set 188.

Additionally or alternatively, the AV configuration set 188 can include adjustments to the seat(s), such as a temperature setting or a specified seat position (434), as described herein. The AV configuration set 188 can further include climate and/or temperature settings for the interior of the AV 109 (436). In some examples, the climate setting can indicate a temperature for the entire interior of the AV 109. Alternatively, the climate setting can indicate a localized temperature based on the user's assigned location within the AV 109 (e.g., for pooled rides). Thus, when the transport facilitation system 100 routes the AV 109 to pick-up multiple riders over the course of a trip, the AV configuration set 188 for each rider can indicate a localized climate control setting for the seat assigned to each respective rider.

In certain aspects, the AV configuration set 188 can include visual settings to configure a display and/or interior lighting of the AV 109 (438). For example, the visual settings can cause the AV 109 to implement mood lighting (e.g., configuring a certain color and/or brightness), turn on a reading light for the user's assigned seat, have a display set up with a home page or content requested by the rider. Additionally or alternatively, the AV configuration set 188 can indicate audio settings, such as a preferred radio station or a set of radio station selections for the rider, and/or can indicate a desired volume (440). Further, the audio settings may include an audio focal point setting to balance and fade the audio system to focus the sound on the rider's assigned seat.

In further aspects, the AV configuration set 188 can include preferred settings for windows, a sunroof or moonroof, mirrors, a convertible setting (e.g., to close or open a top of a convertible AV), and the like (442). Once the AV configuration set 188 has been generated, the transport facilitation system 100 can transmit the AV configuration set 188 to the selected AV 109 so that the AV 109 can configure the interior components to the preferred settings prior to picking up the rider.

Referring to FIG. 4B, the transport facilitation system 100 can service pick-up requests for users throughout a given region over time and over the course of any number of rides or over a given duration (450). Furthermore, as described herein, the transport facilitation system 100 can store comfort profiles 137 for those users that indicate AV configuration and/or setup preferences 133 (452). In certain implementations, a respective user's comfort profile 137 can include the user's attributes 153, such as the user's height, weight, and body type. In one example, the transport facilitation system 100 can classify the comfort profiles 137 in the database 130 based on user attributes 153 in order to perform readily identify and/or search for matching sets of comfort profiles 137 (e.g., to generate a new configuration set 188 for a new user). For a given user of the transportation arrangement service, the transport facilitation system 100 can receive feedback data 193 (e.g., ratings) after some or all of the rides (454). In some aspects, the transport facilitation system 100 can determine whether a current rating for a particular ride (e.g., a present ride just after drop-off) is below a certain threshold (e.g., two out of five stars) (456). If so (457), then the low rating can trigger an analysis of the AV ride itself. In variations, the transport facilitation system 100 can analyze data from each ride regardless of the rating in order to identify or correlate certain aspects or instances of the ride that may have contributed to the rating.

Thus, the transport facilitation system 100 can analyze AV data 196 for the ride for potential causes for the rating (e.g., whether the rating is low or high) or anomalous instances that may be responsible for the rating (458). The transport facilitation system 100 can further analyze historical data in the rider's preference log 132 to determine whether a pattern exists between the present trip and past trips (460) (e.g., a ride characteristic preference). For example, the rider may have a history of inputting low ratings for rides that include a certain ride characteristic (e.g., the AV traveling too slowly when operating in a high caution mode, or where instances of hard braking or acceleration are present in the AV data 196 for the ride). The transport facilitation system 100 can determine whether a pattern or a correlation exists (462). If not (463), the transport facilitation system 100 can log possible correlations between any number of potential causes or anomalies responsible for the rating in the rider preference log 132 for future reference (466). However, if a distinct correlation is found (464), then the transport facilitation system 100 can calculate whether the correlation exceeds a certainty probability threshold (468) (e.g., a 75% certainty that the characteristic or anomalous instance contributed to the rating).

If the identified correlation does not exceed the threshold (467), then the correlation can be logged in the rider's preference log for future reference (466). However, if the identified correlation does exceed the probability threshold (469), then the transport facilitation system 100 can amend or edit the rider's comfort profile 137 to include a learned preference not previously indicated by the rider (470). As an example, the rider may show a history of inputting low ratings when small, compact AVs are selected to transport the rider. Over a number of trips indicating a correlation between small, compact AVs and the low ratings, the transport facilitation system 100 can amend the rider's comfort profile 137 to include a negative preference to avoid selecting small, compact AVs in the future. Thus, prior to selecting an AV 109 to service a received pick-up request 197, the transport facilitation system 100 can consult the rider's comfort profile 137 to filter out small, compact AVs.

Referring still to FIG. 4B, the transport facilitation system 100 can receive adjustment data 163—during or after the ride—corresponding to adjustments made by the rider to the interior systems and components of the AV 109 (472). The adjustment data 196 can indicate adjustments made to, for example, the seat temperature, configuration, or position (474), the climate control system (476), the audio system (478), and/or the visual system (e.g., interior lights or the display) (479). The transport facilitation system 100 can compile the adjustment data 163 in the rider's preference log 132 for pattern recognition analysis (480). Over time, the compiled adjustment data 163 can indicate certain patterns by the user that may reflect new or alternative preferences. Accordingly, the transport facilitation system 100 can analyze historical adjustment data 163 in the preference log 132 (482) to determine whether a pattern exists that may indicate a preference (484). If no pattern is identified (485), then the pattern analysis process may end (486).

However, if a pattern is identified (487), then the transport facilitation system 100 can determine whether the preference corresponding to the pattern exceeds a certainty probability threshold (488). If not (489), then the transport facilitation system 100 can log another instance for the detected pattern and end the process (486). However, if the preference corresponding to the pattern does exceed the threshold (490), then the transport facilitation system 100 can amend or edit the rider's comfort profile 137 to include the learned preference (495).

Figure 5A:
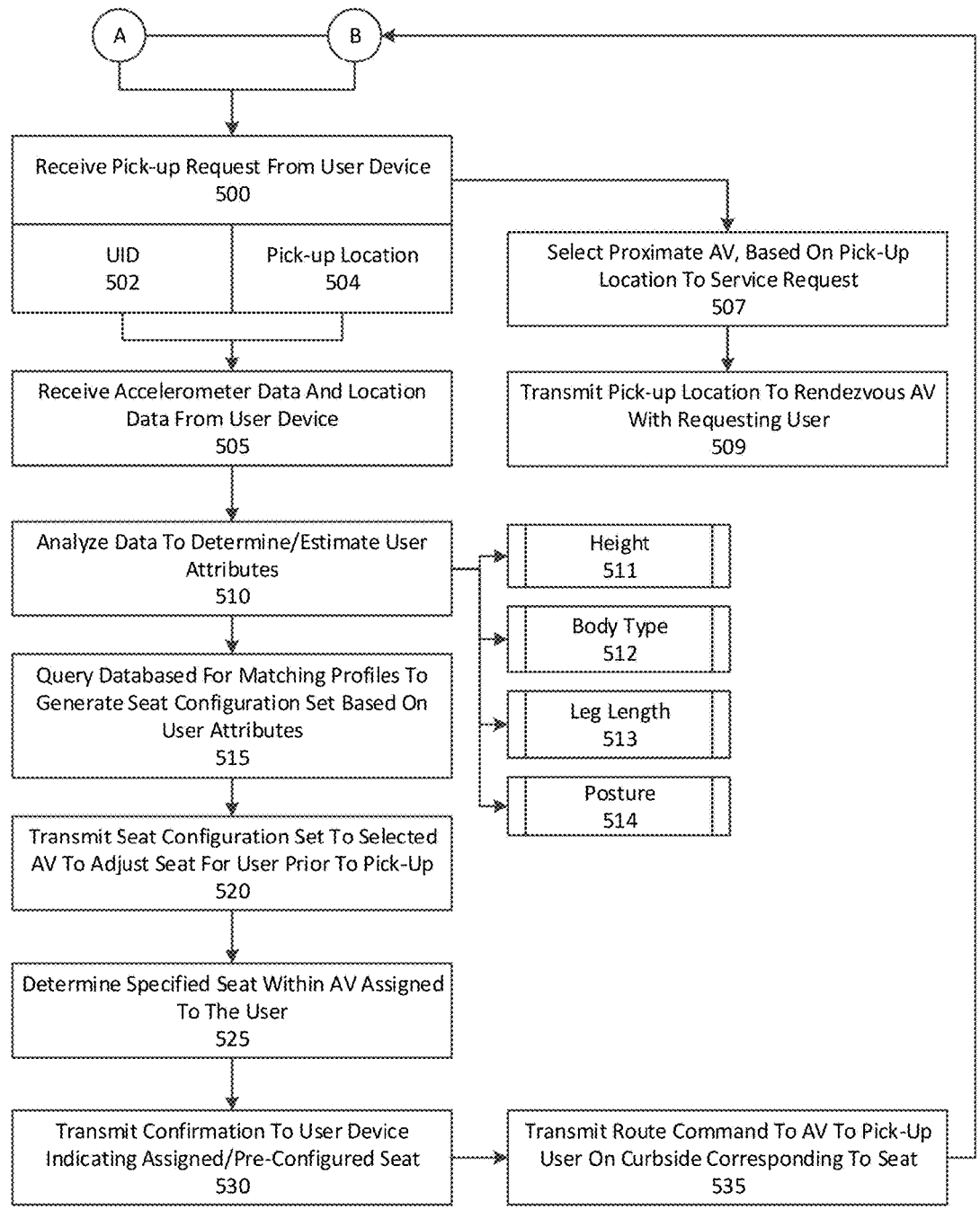
FIGS. 5A and 5B are flow charts describing additional methods of configuring an AV for one or more users, according to examples described herein.
Figure 5B:
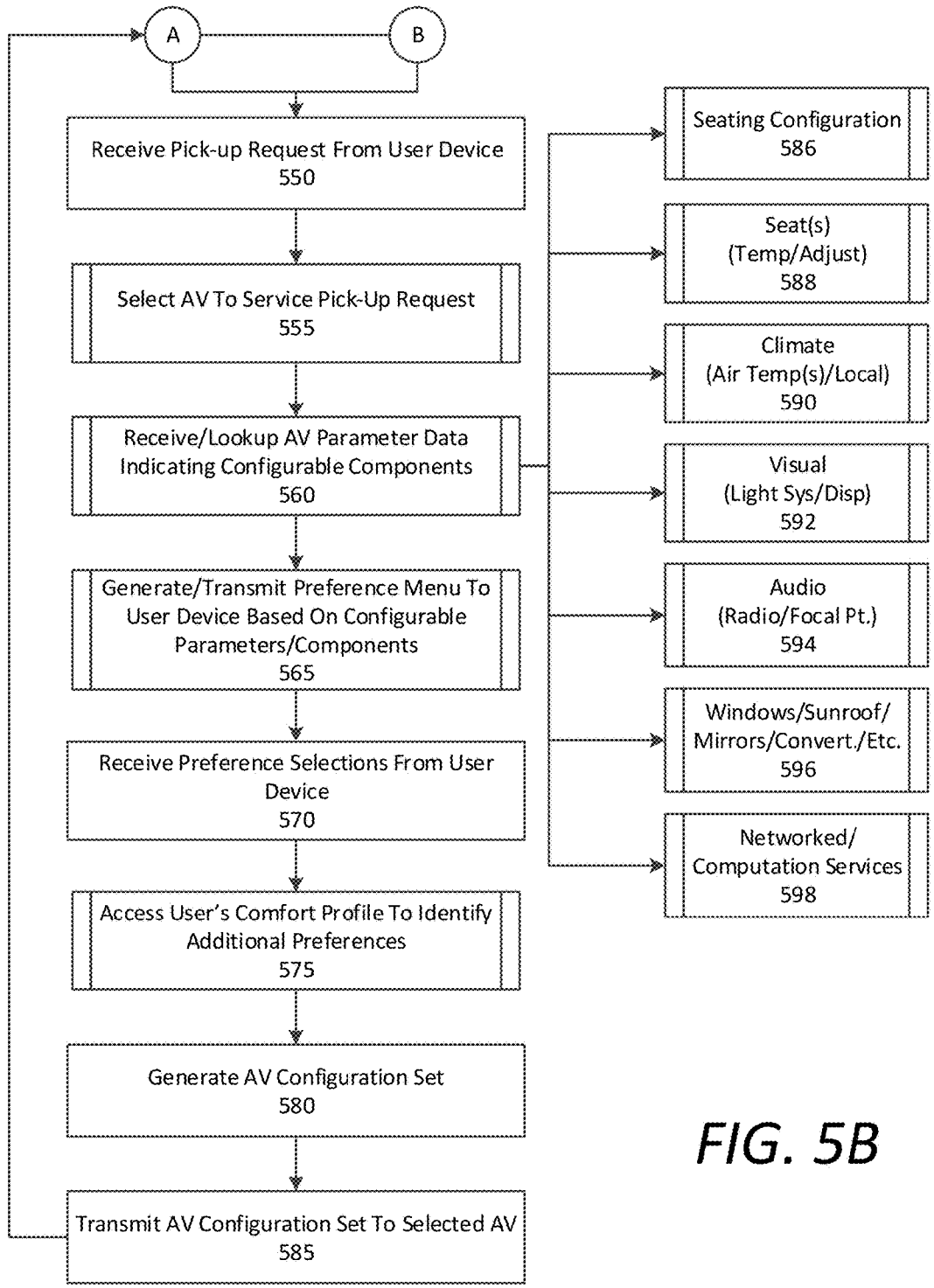

FIGS. 5A and 5B are flow charts describing additional example methods of configuring an AV for one or more users, according to examples described herein. Referring to FIG. 5A, the transport facilitation system 100 can receive a pick-up request 197 from a user device 195 (500). The pick-up request can include a unique identifier 136 (502) and a pick-up location (504). Utilizing the pick-up location, the transport facilitation system 100 can select a proximate AV 109 to service the pick-up request (507), and if accepted, transmit the pick-up location to the selected AV 109 to enable a rendezvous between the AV 109 and the requesting user (509).

According to examples described herein, the transport facilitation system 100 can receive accelerometer data 181 and location data (e.g., GPS data 183) from the user device 195 (505). In some aspects, a confirmation 199 can trigger the transmission of the accelerometer 181 and GPS data 183. In variations, the accelerometer data 181 and GPS data 183 can be received at any time by the transport facilitation system 100 for analysis. Thus, the transport facilitation system 100 can analyze the accelerometer data 181 and the GPS data 183 to determine or estimate a number of user attributes 153 (510). For example, the data can include directional accelerometer peaks that may include force vectors (including a magnitude) that can indicate a gait pattern, stride length, and relative weight of the user. The transport facilitation system 100 can analyze these data to calculate, for example, a height (511), a weight or body type (512), a leg length (513) (and/or femur length), and/or a relative posture (514) (e.g., upright versus slouched) of the user.

Based on the determined or estimated user attributes 153, the transport facilitation system 100 can query the database 130 for matching comfort profiles 137 in order to generate a seat configuration set (515). As described herein, the transport facilitation system 100 can identify a set of matching comfort profiles 137 for user's with similar attributes, and can base the seat configuration set based on the matching comfort profiles. For example, the transport facilitation system 100 can calculate and utilize average(s) of the seat adjustment and positioning settings of the matching comfort profiles 137, and generate the seat configuration set for the requesting user based on the calculated averages. In one example, this seat configuration set can be stored as an initial configuration for the requesting user. The transport facilitation system 100 can then overwrite the initial configuration when the requesting user makes manual adjustments thereafter, and as the transport facilitation system 100 builds a full comfort profile 137 for the requesting user over time.

As further described herein, the seat configuration set can cause the selected AV 109 to adjust various parameters of a seat (e.g., an assigned seat) for the user. For example, the seat configuration set can indicate certain a backrest angle, a thigh extension adjustment (e.g., cushion edge adjustment), a fore-and-aft position, a headrest angle, a headrest level, a lumbar position, a seat depth, a seat height, an upper seat tilt angle, and/or a shoulder support adjustment for the user's seat. Accordingly, the transport facilitation system 100 can transmit the seat configuration set to the selected AV 109 to adjust the user's seat prior to arriving at the pick-up location (520).

In certain implementations, the transport facilitation system 100 can determine a specified seat within the AV 109 that is assigned to the user (525). In one example, the transport facilitation system 100 assigns the seat to the user based on availability (e.g., for pooled rides). In other examples, a default seat may be assigned (e.g., the front left seat) based on convention or rider preference. According to implementations described herein, the transport facilitation system 100 can transmit a seat confirmation to the user device 195 indicating the assigned and/or pre-configured seat (530).

Additionally, the transport facilitation system 100 can transmit a route command to the selected AV 109 indicating route information to pick-up the user on a curbside corresponding to the assigned and/or pre-configured seat (535). For example, the pick-up location can include a street side, which the transport facilitation system 100 can utilize to route the AV 109 and/or assign a particular seat to the user such that the seat side matches the street side in order to avoid having the user walk around to the road traffic side of the AV 109.

FIG. 5B is a flow chart describing another example of configuring an AV for a user. Referring to FIG. 5B, the transport facilitation system 100 can receive a pick-up request 197 from a user device 195 (550), and select an AV 109 to service the pick-up request 197 (555). In some examples, once selected, the transport facilitation system 100 can receive or look up AV parameter data (e.g., in stored AV parameter logs 134) indicating the configurable components of that particular AV 109 (560). Examples described herein recognize that different AVs may be manufactured to include any number of configurable interior components. For example, basic AVs may simply include an interior space with a seating arrangement and no configurable components. More luxurious AVs may include configurable components and systems related to seating configuration (586), seat temperature adjustment, seat positioning, and seating adjustments (588), climate control (e.g., for air temperature and localization) (590), visual systems (e.g., lighting and/or a display system including one or more displays) (592), audio system settings (e.g., radio channel, volume, balance, and fade adjustments) (594), and other components such as windows, sunroof, convertible settings, mirrors, and the like (596).

According to certain implementations, an AV may include network and/or computation features for riders. For example, the AV may include virtual reality or augmented reality features to facilitate work or provide, for example, task-oriented activities such as gameplay. In one example, transport facilitation system 100 can provide services that enable access to certain features of the AV, such as conferencing, secure networking, content viewing, game playing, and the like. Furthermore, such features may be accessible via a user account managed by the backend transport facilitation system 100. Such networked and/or computation services can be preconfigured in the AV configuration set 188 transmitted to the selected AV 109, or inputted by the requesting user via the preference menu 186 on the designated application 185. Thus, the AV configuration set 188 can further include configurations of the networked/computation services available on the AV 109 (598).

In one or more examples, the transport facilitation system 100 can generate a preference menu 186 based on the actual configurable components and parameters of the actual AV 109 selected to service the pick-up request 197, and transmit the preference menu 186 to the user device 195 (565). The user can choose to disregard the menu 186, exit from the menu 186, or make various selections to personalize the selected AV 109 prior to being picked up. The transport facilitation system 100 can receive the preference selections 191 from the user device 195 (570), and optionally access the user's comfort profile 137 to identify any additional preferences 133 (575). Then, the transport facilitation system 100 can generate an AV configuration set 188 indicating the set of configuration preferences to personalize the AV 109 (580). In some aspects, the AV configuration set 188 can include a set of instructions commanding a control system of the AV 109 to automatically configure each of the components according to the user preferences while en route to the pick-up location. Thereafter, the transport facilitation system 100 can transmit the AV configuration set 188 to the selected AV 109 (585).

Figure 6:
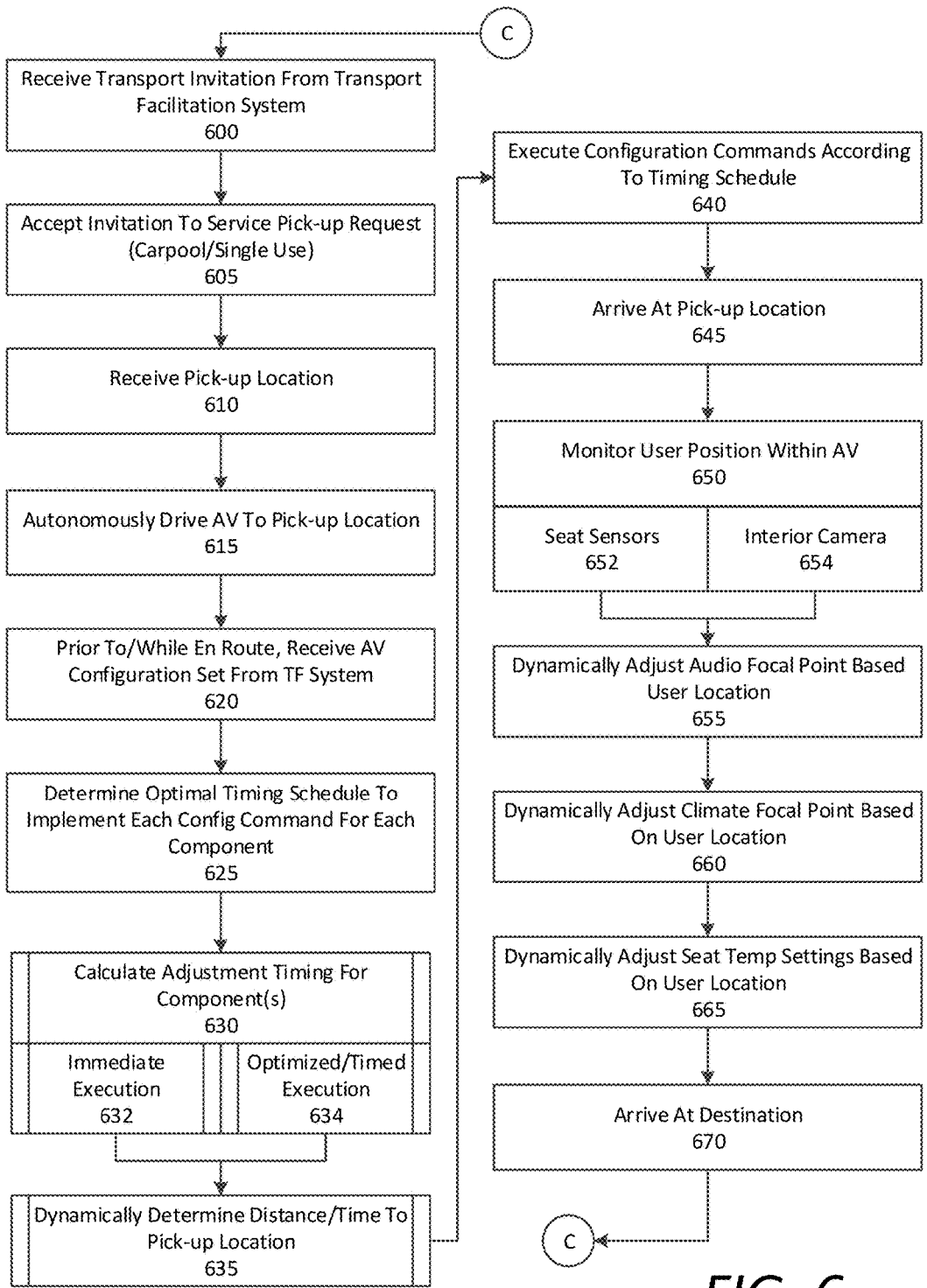
FIG. 6 is a flow chart describing an example method of optimizing timing for configuring an AV for one or more users, according to examples described herein.

FIG. 6 is a flow chart describing an example method of optimizing timing for configuring an AV for one or more users, according to examples described herein. In the below description of FIG. 6, reference may be made to reference characters representing like features illustrated in FIGS. 1-3. Furthermore, the processes described in connection with FIG. 6 may be performed by an example AV 200 as shown and described above with respect to FIG. 2. Referring to FIG. 6, the AV 200 can receive a transport invitation 213 to service a pick-up request 197 from a transportation facilitation system 280 (600). In some examples, the AV 200 may reject the invitation 213 if a certain conflict exists, such as a lack of fuel or power or a service requirement. In variations, the AV 200 can accept the invitation 213, which can comprise a carpooling request or a single use request (605). For carpooling examples, the AV 200 can transport additional passengers and can be routed to several locations to pick-up and drop off passengers on a dynamically calculated route (e.g., by route planner 222).

Prior to or after accepting the invitation 213, the AV 200 can receive the pick-up location (610), and autonomously drive to the pick-up location accordingly (615). Prior to initiating travel, or while en route to the pick-up location, the AV 200 can receive an AV configuration set 218 for the user from the transport facilitation system 280 (620). As described herein, the AV configuration set 218 can include adjustment parameters for various configurable components or interior systems of the AV 200. In various implementations, the AV 200 can determine an optimal timing schedule to implement each configuration command for each component (625). In doing so, the AV 200 can calculate adjustment timing for some or all of the components (630). For some components, the AV 200 can determine that immediate execution is optimal (632). For example, configuration and adjustments to the seats can be performed at any time prior to arriving at the pick-up location. For other components, the AV 200 may determine that optimized or timed execution of the adjustments or configurations may be more optimal for energy and/or practical reasons (634).

For example, the climate control system of the AV 200 can be energy-intensive, especially for extreme temperature differentials between the exterior and interior of the AV 200. Thus, constant optimization of the climate control system may be desirable over the course of many trips in order to optimize energy use. Furthermore, an empty AV 200 traveling with outputted audio or display content is impractical, and thus optimal timing for such systems may indicate initiating the display and audio systems just prior to arriving at the pick-up location. In many aspects, the AV 200 can determine a distance or an estimated time to travel to the pick-up location based on distance and/or traffic conditions (635), and execute the configuration commands according to the calculated timing schedule (640) while en route to the pick-up location. Accordingly, when the AV 200 arrives to pick-up the user (645), all of the configurations can be executed in accordance with the AV configuration set 218.

While the AV 200 autonomously drives to the drop-off destination, the AV 200 can monitor the user's position within the AV 200 (650). In one aspect, the AV 200 can monitor the user's position using seat sensors (652). Additionally or alternatively, the AV 200 can monitor the user's position using one or more interior cameras (654). Accordingly, during the trip, the user may shift positions or change seats within the passenger interior. As the user moves, the AV 200 can dynamically adjust an audio focal point (e.g., the balance and fade of the audio system) based on the user's location (655). Additionally or alternatively, the AV 200 can dynamically adjust the climate control (e.g., the localized temperature) for the user based on the user's location within the AV 200 (660). Additionally or alternatively still, the AV 200 can dynamically adjust seat temperature settings based on the user's location within the AV 200 (665). When the AV 200 arrives at the destination (e.g., a drop-off location) (670), the process can repeat with another user, or continue for carpool implementations, as denoted by reference circle "C."

Hardware Diagrams

Figure 7:
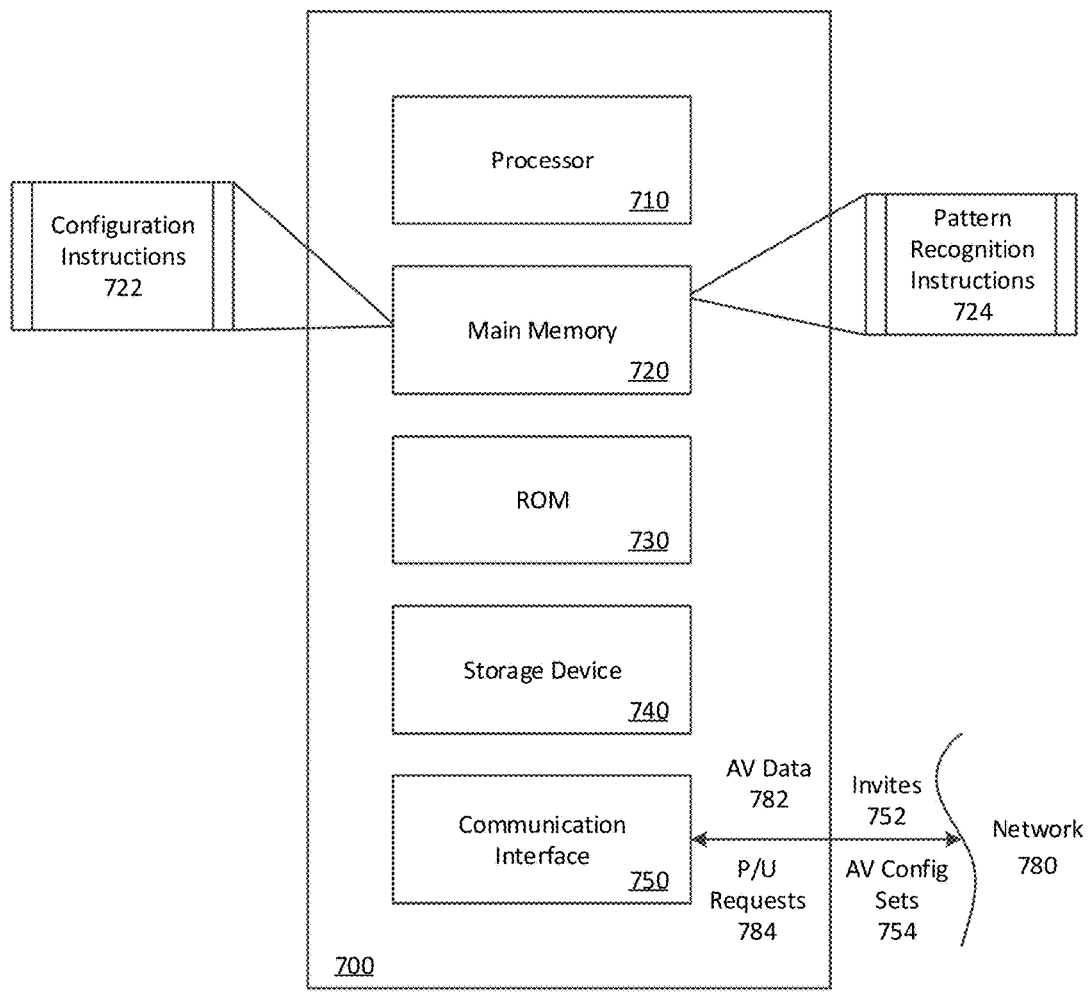
FIG. 7 is a block diagram illustrating a computer system upon which examples described herein may be implemented.

FIG. 7 is a block diagram that illustrates a computer system upon which examples described herein may be implemented. A computer system 700 can be implemented on, for example, a server or combination of servers. For example, the computer system 700 may be implemented as part of a network service for providing transportation services. In the context of FIG. 1, the transport facilitation system 100 may be implemented using a computer system 700 such as described by FIG. 7. The transport facilitation system 100 may also be implemented using a combination of multiple computer systems as described in connection with FIG. 7.

In one implementation, the computer system 700 includes processing resources 710, a main memory 720, a read-only memory (ROM) 730, a storage device 740, and a communication interface 750. The computer system 700 includes at least one processor 710 for processing information stored in the main memory 720, such as provided by a random access memory (RAM) or other dynamic storage device, for storing information and instructions which are executable by the processor 710. The main memory 720 also may be used for storing temporary variables or other intermediate information during execution of instructions to be executed by the processor 710. The computer system 700 may also include the ROM 730 or other static storage device for storing static information and instructions for the processor 710. A storage device 740, such as a magnetic disk or optical disk, is provided for storing information and instructions.

The communication interface 750 enables the computer system 700 to communicate with one or more networks 780 (e.g., cellular network) through use of the network link (wireless or wired). Using the network link, the computer system 700 can communicate with one or more computing devices, one or more servers, and/or one or more AVs. In accordance with examples, the computer system 700 receives pick-up requests 784 from mobile computing devices of individual users. The executable instructions stored in the memory 730 can include configuration instructions 722, which the processor 710 executes to determine user configuration preferences and generate AV configuration sets 754, as described above. The executable instructions stored in the memory 720 can also include pattern recognition instructions 724, which enable the computer system 700 to identify patterns in current and historical AV data 782 that may be correlated to a learned preference. By way of example, the instructions and data stored in the memory 720 can be executed by the processor 710 to implement an example transport facilitation system 100 of FIG. 1. In performing the operations, the processor 710 can receive pick-up requests 784, generate and transmit invitations 752 to AVs to service the pick-up requests 784, receive AV data 782 to learn preferences, and transmit AV configuration sets 754 via the communication interface 750.

The processor 710 is configured with software and/or other logic to perform one or more processes, steps and other functions described with implementations, such as described by FIGS. 1 through 6, and elsewhere in the present application.

Examples described herein are related to the use of the computer system 700 for implementing the techniques described herein. According to one example, those techniques are performed by the computer system 700 in response to the processor 710 executing one or more sequences of one or more instructions contained in the main memory 720. Such instructions may be read into the main memory 720 from another machine-readable medium, such as the storage device 740. Execution of the sequences of instructions contained in the main memory 720 causes the processor 710 to perform the process steps described herein. In alternative implementations, hard-wired circuitry may be used in place of or in combination with software instructions to implement examples described herein. Thus, the examples described are not limited to any specific combination of hardware circuitry and software.

Figure 8:
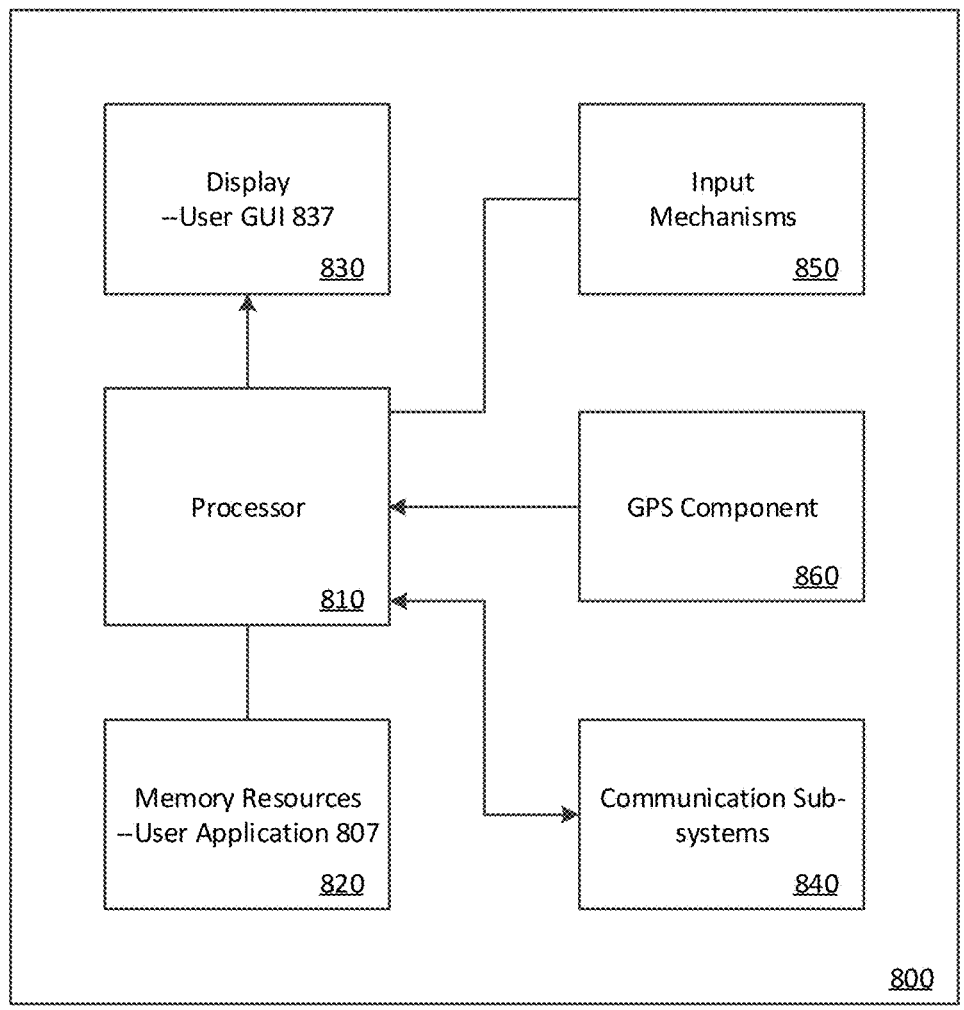
FIG. 8 is a block diagram illustrating a mobile computing device upon which examples described herein may be implemented.

FIG. 8 is a block diagram that illustrates a mobile computing device upon which examples described herein may be implemented. In one example, a mobile computing device 800 may correspond to, for example, a cellular communication device (e.g., feature phone, smartphone etc.) that is capable of telephony, messaging, and/or data services. In variations, the mobile computing device 800 can correspond to, for example, a tablet or wearable computing device. Still further, the mobile computing device 800 can be distributed amongst multiple portable devices of drivers, and requesting users.

In an example of FIG. 8, the computing device 800 includes a processor 810, memory resources 820, a display device 830 (e.g., such as a touch-sensitive display device), one or more communication sub-systems 840 (including wireless communication sub-systems), input mechanisms 850 (e.g., an input mechanism can include or be part of the touch-sensitive display device), and one or more location detection mechanisms (e.g., GPS component) 860. In one example, at least one of the communication sub-systems 840 sends and receives cellular data over data channels and voice channels.

A requesting user of the network service can operate the mobile computing device 800 to transmit a pick-up request including a pick-up location. The memory resources 820 can store a designated user application 807 to link the requesting user with the network service to facilitate a pick-up. Execution of the user application 807 by the processor 810 can cause a user GUI 837 to be generated on the display 830. User interaction with the user GUI 837 can enable the user to transmit a pick-up request in connection with the network service, which enables an AV to accept an invitation to service the pick-up request.

Figure 9:
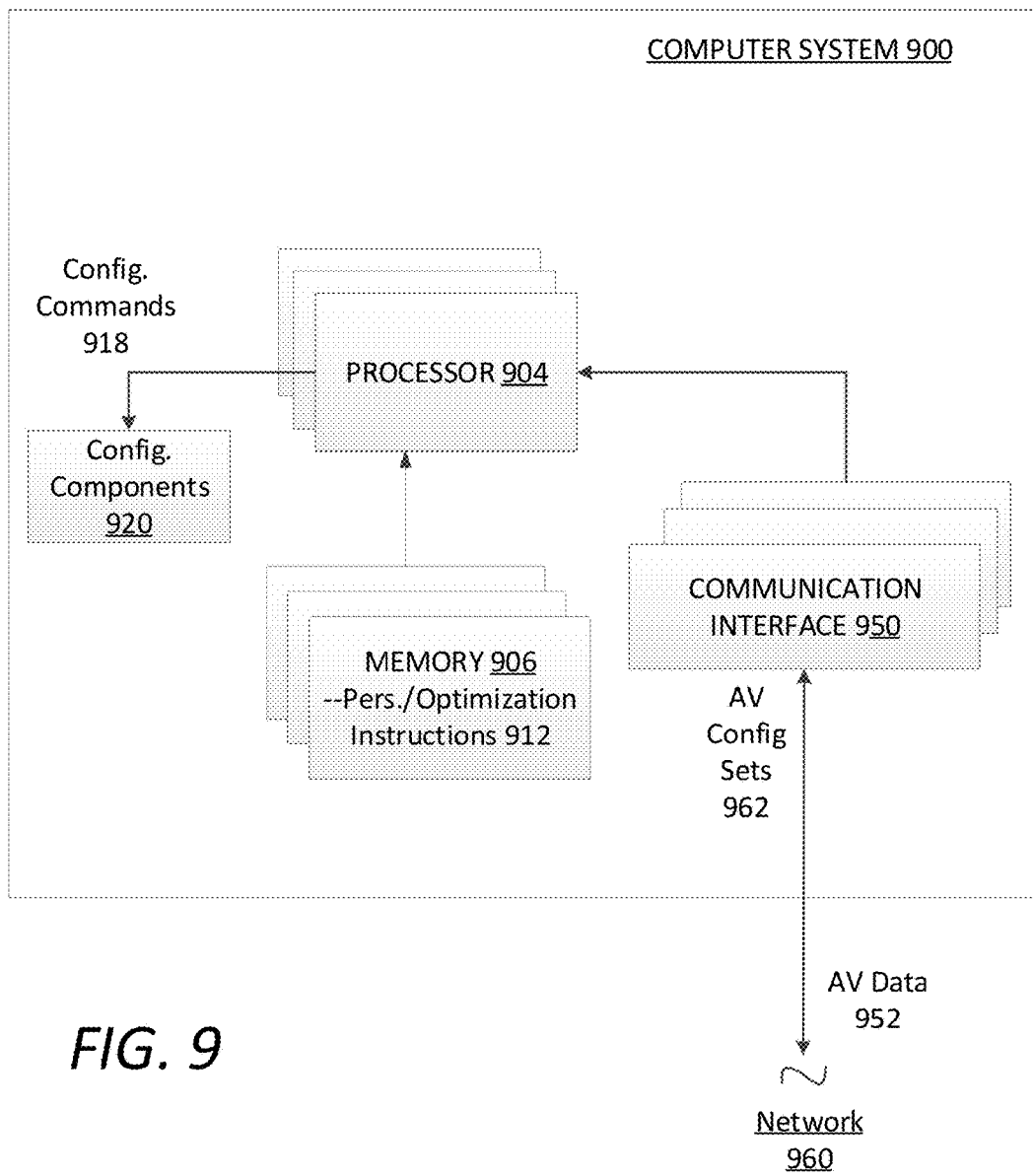
FIG. 9 is a block diagram illustrating a computing system for an AV upon which examples described herein may be implemented.

FIG. 9 is a block diagram illustrating a computer system upon which example AV processing systems described herein may be implemented. The computer system 900 can be implemented using one or more processors 904, and one or more memory resources 906. In the context of FIG. 2, the control system 220 can implemented using one or more components of the computer system 900 shown in FIG. 9.

According to some examples, the computer system 900 may be implemented within an autonomous vehicle with software and hardware resources such as described with examples of FIG. 2. In an example shown, the computer system 900 can be distributed spatially into various regions of the autonomous vehicle, with various aspects integrated with other components of the autonomous vehicle itself. For example, the processors 904 and/or memory resources 906 can be provided in the trunk of the autonomous vehicle. The various processing resources 904 of the computer system 900 can also execute personalization/optimization instructions 912 using microprocessors or integrated circuits. In some examples, the personalization/optimization instructions 912 can be executed by the processing resources 904 or using field-programmable gate arrays (FPGAs).

In an example of FIG. 9, the computer system 900 can include a local communication interface 950 (or series of local links) to vehicle interfaces and other resources of the autonomous vehicle (e.g., the computer stack drives). In one implementation, the communication interface 950 provides a data bus or other local links to electro-mechanical interfaces of the vehicle, such as wireless or wired links to and from the AV control system 220, and can provide a network link to a transport facilitation system over one or more networks 960.

The memory resources 906 can include, for example, main memory, a read-only memory (ROM), storage device, and cache resources. The main memory of memory resources 906 can include random access memory (RAM) or other dynamic storage device, for storing information and instructions which are executable by the processors 904. The processors 904 can execute instructions for processing information stored with the main memory of the memory resources 906. The main memory 906 can also store temporary variables or other intermediate information which can be used during execution of instructions by one or more of the processors 904. The memory resources 906 can also include ROM or other static storage device for storing static information and instructions for one or more of the processors 904. The memory resources 906 can also include other forms of memory devices and components, such as a magnetic disk or optical disk, for purpose of storing information and instructions for use by one or more of the processors 904.

According to some examples, the memory 906 may store a plurality of software instructions including, for example, personalization/optimization instructions 912. The personalization/optimization instructions 912 may be executed by one or more of the processors 904 in order to implement functionality such as described with respect to FIGS. 2 and 6.

In certain examples, the computer system 900 can receive AV configuration sets 962 via the communication interface 950 and network 960 from a transport facilitation system. In executing the personalization/optimization instructions 912, the processing resources 904 can generate and execute configuration commands 918 to adjust and configure the various configurable components 920 of the AV. Furthermore, the processing resources 904 can transmit AV data 952, as described herein, to the transport facilitation system over the network 960.

While examples of FIGS. 7 through 9 provide for computing systems for implementing aspects described, some or all of the functionality described with respect to one computing system of FIGS. 7 through 9 may be performed by one or more other computing systems described with respect to FIGS. 7 through 9.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. An autonomous vehicle (AV) comprising:
a configurable interior system;
a sensor system to generate sensor data corresponding to a situational environment of the AV;
acceleration, steering, and braking systems; and
a control system executing instructions that cause the control system to:
receive, over one or more networks from a transport facilitation system, (i) a pick-up location to rendezvous with a rider, and (ii) a set of configuration instructions to configure one or more adjustable components of the configurable interior system for the rider;
analyze the sensor data to autonomously control the acceleration, steering, and braking systems along a route to the pick-up location; and
execute, prior to arriving at the pick-up location, the set of configuration instructions to configure the one or more adjustable components of the configurable interior system for the rider.

2. The AV of claim 1, wherein the one or more adjustable components comprise at least one of adjustable seats, adjustable windows, a climate control system, one or more displays, interior lights, and an audio system of the AV.

3. The AV of claim 2, wherein the executed instructions further cause the control system to:
classify each of the one or more adjustable components for (i) immediate execution, or (ii) timed execution.

4. The AV of claim 3, wherein one of the one or more adjustable components classified for timed execution comprises the climate control system.

5. The AV of claim 4, wherein the set of configuration instructions include a preferred climate setting for the AV, and wherein the executed instructions cause the control system to determine a timing schedule for the preferred climate setting by (i) determining a travel time to the pick-up location, (ii) determining a time frame to adjust an interior temperature of the AV based on the preferred climate setting, and (iii) setting an execution time for the climate control system of the configurable interior system based on the travel time and the time frame.

6. The AV of claim 3, wherein one of the one or more adjustable components classified for immediate execution include an adjustable seat component.

7. The AV of claim 2, wherein the executed instructions further cause the control system to:
after picking up the rider at the pick-up location, monitor a location of the rider within an interior of the AV.

8. The AV of claim 7, wherein the executed instructions further cause the control system to:
based on the location of the rider, adjust a climate control focal point of the climate control system.

9. The AV of claim 7, wherein the executed instructions further cause the control system to:
based on the location of the rider, adjust an audio focal point of the audio system.

10. The AV of claim 9, wherein the executed instructions cause the control system to adjust the audio focal point by adjusting at least one of a balance or a fade of the audio system based on the location of the rider.

11. A non-transitory computer-readable medium storing instructions that, when executed by a control system of an autonomous vehicle (AV), cause the control system to:
- receive, over one or more networks from a transport facilitation system, (i) a pick-up location to rendezvous with a rider, and (ii) a set of configuration instructions to configure one or more adjustable components of a configurable interior system of the AV for the rider;
- analyze sensor data generated by a sensor system of the AV data to autonomously control acceleration, steering, and braking systems of the AV along a route to the pick-up location; and
- execute, prior to arriving at the pick-up location, the set of configuration instructions to configure the one or more adjustable components of the configurable interior system for the rider.

12. The non-transitory computer-readable medium of claim 11, wherein the one or more adjustable components comprise at least one of adjustable seats, adjustable windows, a climate control system, one or more displays, interior lights, and an audio system of the AV.

13. The non-transitory computer-readable medium of claim 12, wherein the executed instructions further cause the control system to:
- classify each of the one or more adjustable components for (i) immediate execution, or (ii) timed execution.

14. The non-transitory computer-readable medium of claim 13, wherein one of the one or more adjustable components classified for timed execution comprises the climate control system.

15. The non-transitory computer-readable medium of claim 14, wherein the set of configuration instructions include a preferred climate setting for the AV, and wherein the executed instructions cause the control system to determine a timing schedule for the preferred climate setting by (i) determining a travel time to the pick-up location, (ii) determining a time frame to adjust an interior temperature of the AV based on the preferred climate setting, and (iii) setting an execution time for the climate control system of the configurable interior system based on the travel time and the time frame.

16. The non-transitory computer-readable medium of claim 12, wherein the executed instructions further cause the control system to:
- after picking up the rider at the pick-up location, monitor a location of the rider within an interior of the AV.

17. The non-transitory computer-readable medium of claim 16, wherein the executed instructions further cause the control system to:
- based on the location of the rider, adjust a climate control focal point of the climate control system.

18. The non-transitory computer-readable medium of claim 16, wherein the executed instructions further cause the control system to:
- based on the location of the rider, adjust an audio focal point of the audio system.

19. A computer-implemented method of configuring an interior system of an autonomous vehicle (AV), the method being performed by a control system of the AV and comprising:
- receiving, over one or more networks from a transport facilitation system, (i) a pick-up location to rendezvous with a rider, and (ii) a set of configuration instructions to configure one or more adjustable components of a configurable interior system of the AV for the rider;
- analyzing sensor data generated by a sensor system of the AV to autonomously control acceleration, steering, and braking systems of the AV along a route to the pick-up location; and
- executing, prior to arriving at the pick-up location, the set of configuration instructions to configure the one or more adjustable components of the configurable interior system for the rider.

20. The method of claim 19, wherein the one or more adjustable components comprise at least one of adjustable seats, adjustable windows, a climate control system, one or more displays, interior lights, and an audio system of the AV.

* * * * *